United States Patent
Kim et al.

(10) Patent No.: US 7,463,323 B2
(45) Date of Patent: Dec. 9, 2008

(54) LIQUID CRYSTAL DISPLAY

(75) Inventors: Sang-Soo Kim, Seoul (KR); Dong-Gyu Kim, Kyungki-do (KR); Woon-Yong Park, Kyungki-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 205 days.

(21) Appl. No.: 10/739,195

(22) Filed: Dec. 19, 2003

(65) Prior Publication Data

US 2004/0141099 A1 Jul. 22, 2004

Related U.S. Application Data

(62) Division of application No. 10/174,054, filed on Jun. 19, 2002, now Pat. No. 6,717,634, which is a division of application No. 09/174,429, filed on Oct. 19, 1998, now Pat. No. 6,429,909.

(30) Foreign Application Priority Data

| Oct. 18, 1997 | (KR) | ................................ 97-53512 |
| Apr. 10, 1998 | (KR) | ................................ 98-12770 |
| Jun. 24, 1998 | (KR) | ................................ 98-23852 |
| Oct. 12, 1998 | (KR) | ................................ 98-42533 |

(51) Int. Cl.
 *G02F 1/1343* (2006.01)
 *G02F 1/136* (2006.01)
 *G02F 1/1333* (2006.01)
(52) U.S. Cl. ............................. 349/139; 349/42; 349/54
(58) Field of Classification Search ............. 349/54–55, 349/192, 42–43, 139
 See application file for complete search history.

(56) References Cited

U.S. PATENT DOCUMENTS 4,938,567 A 7/1990 Chartier ...................... 359/245

(Continued)

FOREIGN PATENT DOCUMENTS

JP 4-13033 1/1992

(Continued)

OTHER PUBLICATIONS

Patent Abstracts of Japan, Publication No. 04-013033, Jul. 17, 1992, 1 p.

(Continued)

*Primary Examiner*—Dung T. Nguyen
(74) *Attorney, Agent, or Firm*—MacPherson Kwok Chen & Heid LLP

(57) ABSTRACT

A gate line is formed on a substrate in a horizontal direction and a data repair line is formed on the same layer as the gate line in a vertical direction. The repair line is divided into two portions with respect to the gate line. A gate insulating film is formed on the gate line and the data repair line, and a data line is formed on the gate insulating film along the repair line having a smaller width than the repair line, a passivation film being deposited thereon. Contact holes are formed in the passivation film, and contact holes to expose both ends of the divided repair line are formed in the passivation film and gate insulating film. A transparent connecting pattern formed on the passivation film contacts the data line and the repair line through the contact holes. Both ends of the repair line are extended from the data line. A pixel electrode is formed on the passivation film, and the pixel electrode overlaps the edges of the repair line at a predetermined width. The repair line functions as a signal transmitting path when the data line is disconnected, and as a black matrix for blocking light-leakage. The transparent connecting pattern acts as a path when the data line is disconnected at the portion where the gate line intersects the data line.

17 Claims, 39 Drawing Sheets

U.S. PATENT DOCUMENTS

| | | | |
|---|---|---|---|
| 5,028,122 A | 7/1991 | Hamada et al. | 349/38 |
| 5,517,341 A * | 5/1996 | Kim et al. | 349/42 |
| 6,146,796 A * | 11/2000 | Kim | 430/30 |
| 6,262,784 B1 * | 7/2001 | Kim | 349/43 |
| 6,307,216 B1 | 10/2001 | Huh et al. | 257/59 |
| 6,429,909 B1 | 8/2002 | Kim et al. | 249/54 |
| 6,433,764 B1 * | 8/2002 | Hebiguchi et al. | 345/87 |
| 6,650,378 B2 * | 11/2003 | Kobayashi et al. | 349/43 |
| 2002/0158994 A1 * | 10/2002 | Hashimoto et al. | 349/43 |

FOREIGN PATENT DOCUMENTS

| | | |
|---|---|---|
| JP | 05-005898 | 1/1993 |
| JP | 5-297405 | 11/1993 |
| JP | 06-160904 | 6/1994 |
| KR | 1998-049437 | 9/1998 |

OTHER PUBLICATIONS

Patent Abstracts of Japan, Publication No. 05-297405. Nov. 12, 1993, 1 p.

Korean Patent Abstracts, Publication No. 1019980049437, Sep. 15, 1998, 1 p.

* cited by examiner

LIQUID CRYSTAL DISPLAY

This is a divisional application of U.S. application Ser. No. 10/174,054 filed Jun. 19, 2002 now U.S. Pat. No. 6,717,634, of which is a divisional of U.S. patent application Ser. No. 09/174,429 filed Oct. 19, 1998, which now become U.S. Pat. No. 6,429,909 B1, of which benefit and priority is claimed hereby and the entirety of which are hereby incorporated by reference.

BACKGROUND OF THE INVENTION (a) Field of the Invention

The present invention relates to liquid crystal displays (LCDs) and manufacturing methods thereof.

(b) Description of the Related Art

In LCDs, an electric field is applied to liquid crystal material injected between two substrates, an array substrate and a counter substrate, arranged substantially parallel to one another with a predetermined gap therebetween. Formed on the array substrate are a plurality of gate lines disposed parallel to one another, and a plurality of data lines insulated from and crossing the gate lines. A plurality of pixel electrodes are formed corresponding to respective regions defined by the intersecting data lines and gate lines. Furthermore, a thin film transistor (TFT) is provided near each of the intersections of the gate lines and the data lines. Each pixel electrode is connected to a data line via a corresponding TFT, the TFT serving as a switching device therebetween.

Such TFT-LCDs are formed by laying a plurality of thin films, one at a time, and etching the same. However the films tend to break open in certain areas, causing a disconnection of the portion of the films. To prevent this, the data lines are doubled at portions where they overlap the gate lines. A metal layer may also be deposited and patterned either over or under the data lines, following the pattern of the same to form repair lines.

In the first method, the data lines disconnected in areas other than the intersection require additional lines to repair the damaged portion. Furthermore, a laser junction process used to repair the disconnected data lines may not be easily applied to high-resolution displays.

Since the second method deposits and patterns the metal layer to form the repair lines and subsequently deposits and etches an insulating layer to connect the repair lines to the data lines, the overall LCD manufacturing process becomes complicated due to the additional steps.

An LCD having a couple of gate lines in a pixel may be used to prevent defects by the disconnection of the gate line. The LCD includes a couple of the gate lines parallel to each other, and a connecting line that links the gate lines. A secondary line to repair the disconnected data lines is formed in parallel with the connecting line, and a data line overlaps the secondary line. Since the secondary line and the data line are electrically connected to each other, data signals are transmitted through the secondary line when the data line is disconnected.

However, the narrow space between the secondary line and the connecting line increases a coupling capacitance between the data line and the connecting line and delays the digital signal. Furthermore, the connecting line and the secondary line may be short-circuited by conductive particles.

SUMMARY OF THE INVENTION

The present invention has been made in an effort to solve the above problems.

It is an object of the present invention to provide an LCD and a manufacturing method thereof in which a repair line structure is used to minimize defects caused by the disconnection of data lines without introducing additional steps.

It is another object of the present invention to provide an LCD and a manufacturing method thereof in which a light-blocking layer is substituted with repair lines, thereby improving the aperture ratio.

It is another object of the present invention to provide a structure having double gate lines, which prevents signal delays and short-circuit defects of a data line and a gate line.

It is another object of the present invention to provide a structure that keeps an aperture ratio from decreasing, in a structure having double gate lines.

To achieve the above objects, the present invention provides an LCD and a manufacturing method thereof in which repair lines, substituting open-line data lines, are made of a metal layer for gate lines on the same layer as the gate lines, and are separately formed on either side of the gate lines. Data lines are formed intersecting gate lines on an insulating layer that covers the repair lines.

Further, a plurality of repair lines, substituting an open-line data line, are made of a metal layer for gate wires on the same layer as the gate lines, and are divided into a plurality of portions by the gate lines and overlap pixel electrodes.

The repair lines are electrically connected to the data lines to transmit data signals when the data lines are disconnected.

Furthermore, the repair lines overlap the edges of the pixel electrodes to shield the light-leakage area by fringe fields near the edges of the pixel electrodes.

The width of the repair lines is larger than that of the data lines.

The data lines are divided into two lines at the portion where the data lines cross the gate lines so when one of the lines is disconnected, signals can be transmitted through the other line.

The repair lines and the data lines can be directly, or indirectly, connected by another connecting means.

The connecting means includes transparent conductive patterns which are made of the same material as the pixel electrodes. These transparent conductive patterns are connected to separate repair lines and to the data line on either side of the gate line. Even in the case where the repair lines connect the data lines directly, transparent conductive patterns may be connected to the data lines on either side of the intersecting portions of the data lines and the gate lines. The transparent conductive patterns can act as a path for signals when the data lines become disconnected at the intersections.

In a twisted-nematic LCD or a vertically-aligned LCD having different liquid crystal disclination widths at both sides of the pixels, the pixel electrode is overlapped on both edges of the repair line with the overlapping edges having different widths.

The edges of the pixel electrode overlap the gate lines.

The repair lines or the gate lines overlapping the edges of the pixel electrodes prevent light-leakage from occurring around the edges of the pixel and increase the aperture ratio.

In the LCD of this structure, the repair line is laid in the process of forming the gate lines; and the transparent conductive connecting patterns are formed in the process of forming the transparent pixel electrodes.

As a result, the repair lines and connecting patterns for repairing the data line defects are formed without an additional process, which simplifies the manufacturing process.

In another embodiment of the present invention having double gate lines formed in parallel with each other in a horizontal direction, a connecting line that connects one of the gate lines to the other of the gate lines is vertically formed, passing across the center of a pixel region which is defined by the double gate lines and the data lines.

As described, since the connecting line is located far away from the data line and the secondary line, it is quite rare that the data signals affect the connecting line and conductive impurities short-circuit the connecting line and the secondary line.

The connecting line may not necessarily be formed in every pixel region.

A projecting portion, which is enhanced from the gate line of the pixel region having no connecting line, is formed to increase the overlapping area of the pixel electrode and the gate line.

The pixels where the connecting lines are formed may be arranged on the whole substrate at their options. However, it is required that the number of the pixels, where the connecting lines are formed, are larger than the number of the pixels where the connecting lines are not formed. It is required that the ratio of the number of the pixels having the connecting lines to the number of the pixels having no connecting lines is more than 1:3.

It is also possible that the connecting line is formed under the data line, not in the center of the pixel region, and the secondary lines are formed under the data lines under which the connecting line is not formed. In this case, it is required that the number of the connecting lines are smaller than the number of the secondary lines, and the ratio is preferably 1:10.

A connecting means, which links both ends of the secondary lines on the both sides with respect to the gate line to the data line, may be included, and the connecting means may be made of a transparent conductive material.

In this structure, the connecting line laid under the data line increases the aperture.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
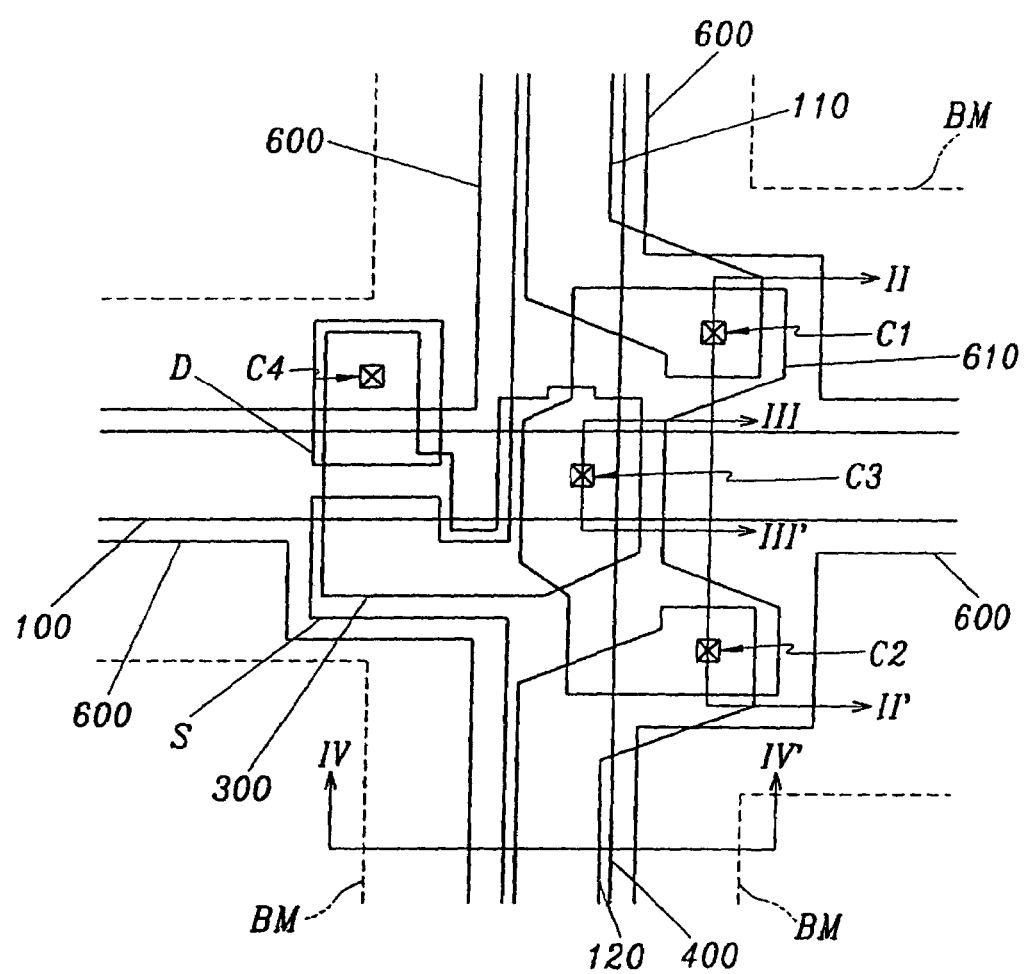
FIG. 1 is a layout view of an LCD according to a first embodiment of the present invention.

The present invention now will be described more fully hereinafter with reference to the accompanying drawings, in which preferred embodiments of the invention are shown. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Now, a liquid crystal display (LCD) and a manufacturing method thereof will be described hereinafter.

Figure 2:
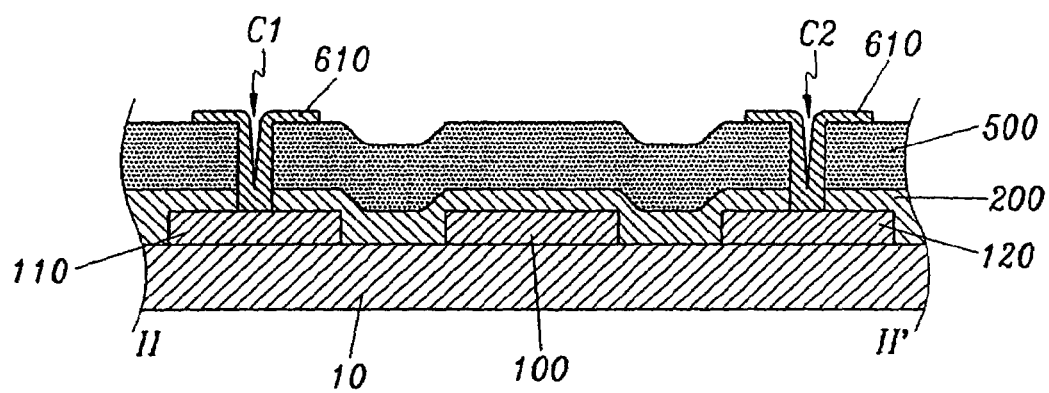
FIG. 2 and FIG. 3 are cross-sectional views taken along lines II-II' and III-III' of FIG. 1.
Figure 3:
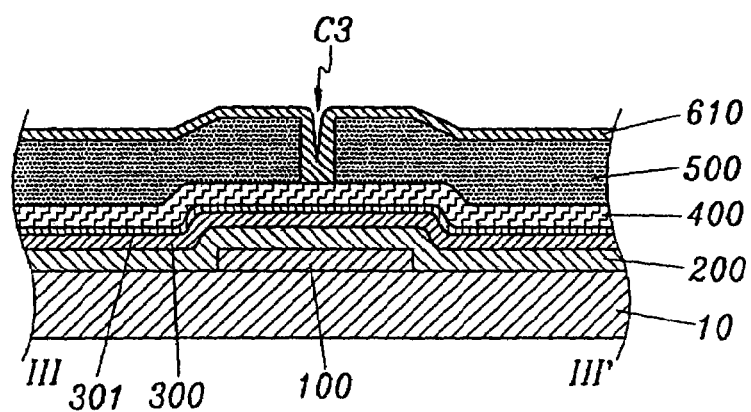

FIG. 1 is a layout view of an LCD having data repair lines according to a first embodiment of the present invention, FIG. 2 and FIG. 3 are cross-sectional views taken along lines II-II' and III-III' of FIG. 1, respectively. In the drawings, the repair lines of metal that can be used for gate lines such as aluminum (Al) are laid under a data line where the data line intersects a gate line. The repair lines are connected at the point where the data line and gate line intersect by an indium tin oxide (ITO) pattern.

As shown in FIGS. 1 to 3, a gate line 100 transmitting scanning signals is formed on a transparent insulating substrate 10 in a horizontal direction, and repair lines 110 and 120 are formed in a vertical direction. The repair lines 110 and 120 are disconnected at the gate line 100. That is, the repair lines 110 and 120 are divided into two portions on either side of the gate line 100. End portions of the repair lines 110 and 120 are bent at a predetermined angle and extended therefrom.

The gate line 100 and the repair lines 110 and 120 are covered with a gate insulating film 200. A channel layer 300, made of a semiconductor material such as amorphous silicon, is formed on the gate insulating film 200 over the gate line 100. A data line 400, through which display signals are transmitted, is vertically formed on the gate insulating film 200 over the repair lines 110 and 120.

A source electrode (S), which is extended from the data line 400, and a drain electrode (D), made of the same material as the source electrode (S), overlap both sides of the channel layer 300. An Ohmic contact layer 301 made of n+ amorphous silicon is interposed between the source and drain electrodes (S and D) and the channel layer 300 to reduce the contact resistivity between the channel layer 300 and the source and drain electrodes (S and D).

The following layer is a passivation film 500 over Which a plurality of transparent pixel electrodes 600 are formed. A plurality of pixel regions are defined by the intersection of the gate lines 100 and the data lines 400. The pixel electrodes 600 are made of a transparent conductive material such as ITO and is connected to the drain electrode (D) through a contact hole (C4) formed in the passivation film 500.

Further, a transparent conductive connecting pattern 610, made of the same material as the pixel electrode 600, overlaps the ends of the repair lines 110 and 120 and the portion where the gate line 100 and the data line 400 intersect. The connecting pattern 610 is connected to the angled and extended bends of the repair lines 110 and 120 through contact holes C1 and C2 formed in the gate insulating film 200 and the passivation film 500, and is also connected to the data line 400 through a contact hole C3 provided in the passivation film 500.

Since the connecting pattern 610 is formed on the portion where the gate line 100 and the data line 400 intersect (i.e., where layers break open easily), the connecting pattern 610, connected to the repair lines 110 and 120, can be a path through which the signals are transmitted when the data line 400 breaks in this area.

Figure 4:
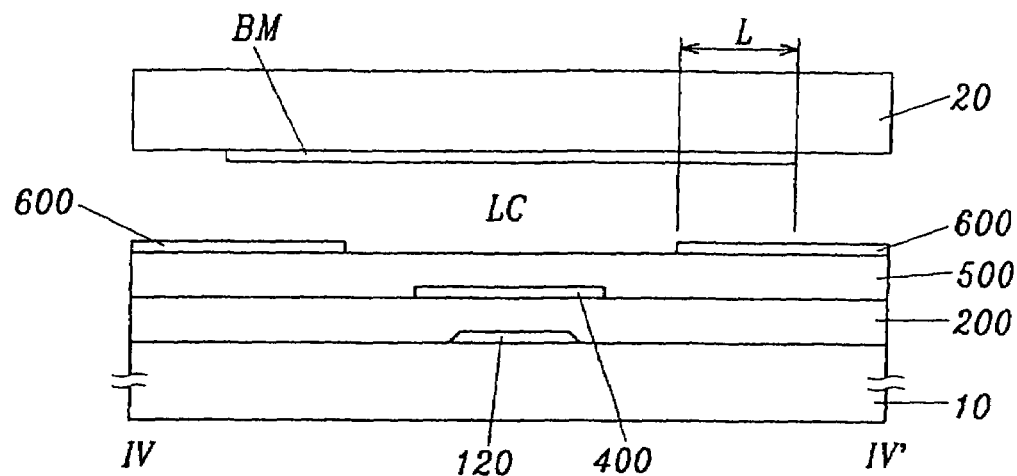
FIG. 4 is a cross-sectional view taken along line IV-IV' of FIG. 1.

FIG. 4 shows a cross-sectional view taken along line IV-IV' of FIG. 1, in a state where the TFT substrate according to the first embodiment is arranged with the color filter substrate.

In FIG. 4, a coupling capacitance occurs between the data line 400, to which varying signals are applied, and the pixel electrode 600. Since the coupling capacitance may disrupt the liquid crystal arrangement at edges of the pixel electrode 600, the leakage of light increases at the edges of the pixel electrode 600. To cover the region where light leakage occurs, a black matrix (BM) is formed on an upper color filter substrate 20 and arranged to cover the edges of the TFT, the data line 400, and the edges of the pixel electrode 600 formed on the lower substrate 10.

If the black matrix (BM) is provided on the upper substrate 20 in such a manner as to cover the edges of the pixel electrode 600, the width of the black matrix (BM) is determined by considering misalignment between the upper substrate 20 and the lower substrate 10. Accordingly, an overlap width (L) between the black matrix (BM) and the pixel electrode 600 is larger than the range of possible misalignment of the substrates 10 and 20. However, this structure ultimately decreases the aperture ratio.

Figure 5:
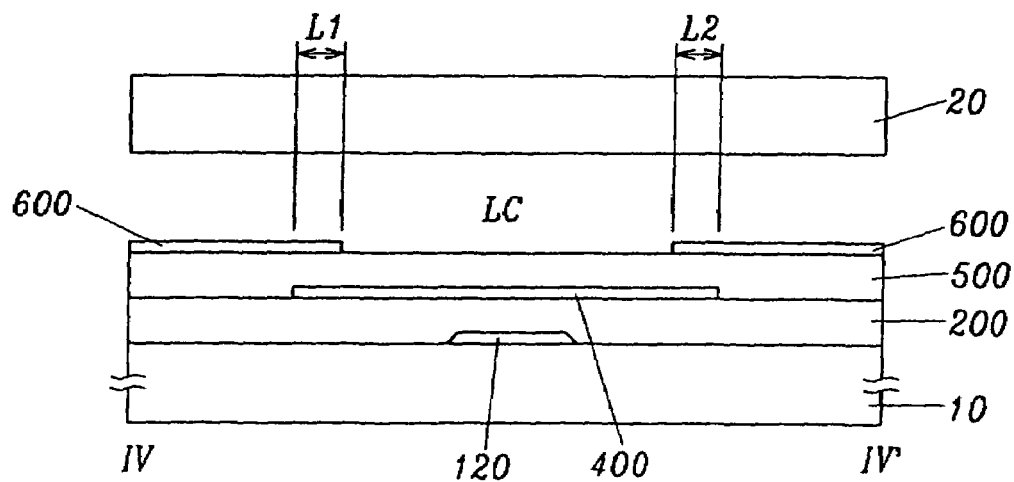
FIG. 5 is a cross-sectional view taken along line IV-IV' of FIG. 1 according to a second embodiment of the present invention.

To remedy this problem, the present invention provides a second embodiment shown in FIG. 5. In the drawing, a data line 400 on a lower substrate 10 is expanded to overlap the edges of a pixel electrode 600 by widths L1 and L2. As a result, the data line 400 can be substituted for the black matrix (BM) of the first embodiment to cover misalignment of an upper substrate 20 and the lower substrate 10. The remaining elements of the second embodiment are structured and arranged identically as in the first embodiment.

However, in the second embodiment, the distance between the data line 400 and the pixel electrode 600 is decreased when compared with the first embodiment, resulting in the increased coupling capacitance and the inferior display quality. One way to avoid this problem is to increase the thickness of a passivation film 500. However, there is a limit to how thick the passivation film 500 can be formed using the conventional chemical vapor deposition (CVD) method. To solve this problem, the passivation film may be made of an organic material with a thickness of several μm, but this causes an inferior transmissivity.

In a third embodiment of the present invention, the distance between a pixel electrode 600 and a data line 400 is greater than that in the first embodiment. Instead, a repair line 120 under the data line 400 is formed wide enough to cover the disclination region.

Figure 6:
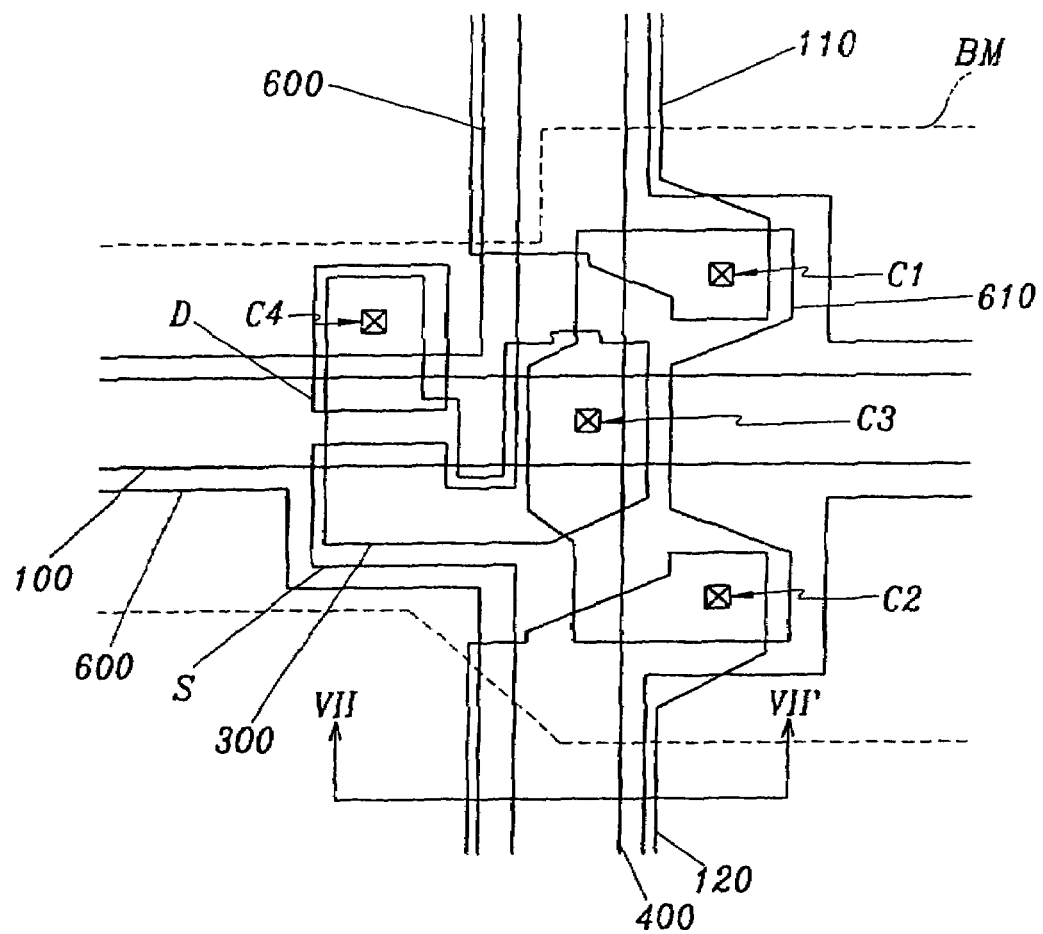
FIG. 6 is a layout view of an LCD according to a third embodiment of the present invention.
Figure 7:
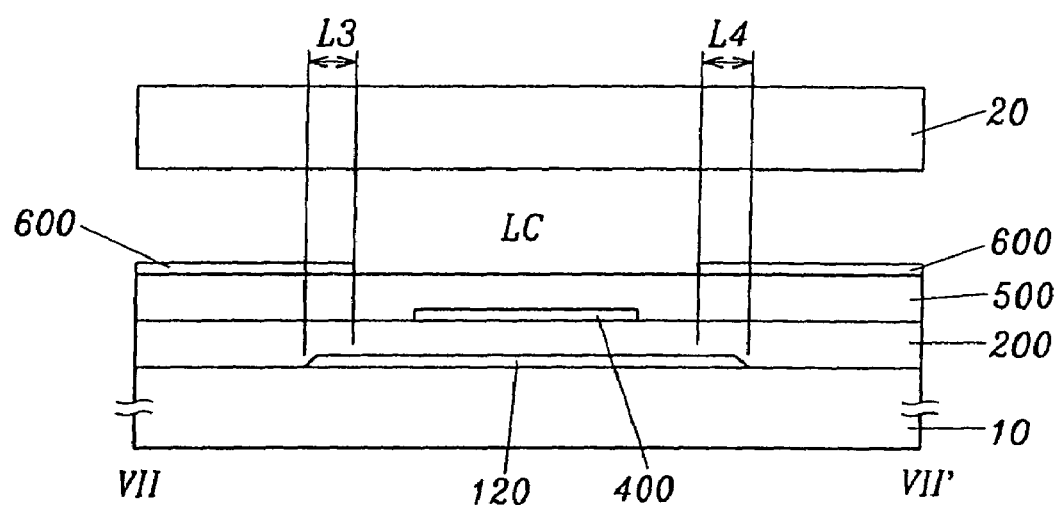
FIG. 7 is a cross-sectional view taken along line VII-VII' of FIG. 6.

FIG. 6 is a layout view of an LCD having a repair line according to the third embodiment of the present invention; and FIG. 7 is a cross-sectional view taken along line VII-VII' of FIG. 6. As shown in the drawings, a gate line 100, a channel layer 300, an Ohmic contact layer 301, the repair lines 120 and a repair line 110, the transparent pixel electrode 600 and a connecting pattern 610 are formed identically as in the first and second embodiments.

In the third embodiment, the repair lines 110 and 120 are formed wider than the width of the data line 400 and overlap the edges of the pixel electrodes 600 at both sides to compensate for misalignment occurring along the data line 400.

In the first embodiment, the black matrix (BM) is provided on the upper substrate 20 to cover the edges of the pixel electrode 600 with the width of the black matrix (BM) being determined by considering misalignment between the upper substrate 20 and the lower substrate 10. However, in the third embodiment, the repair lines 110 and 120 overlap the pixel electrode 600 by a width corresponding to a range of possible misalignment, thereby improving the aperture ratio. Further, a black matrix (BM) of an upper substrate 20, which is disposed to correspond to a lower substrate 10 having the above structure, is formed in a horizontal direction to cover a TFT and the edges of the gate line 100.

In FIG. 7, the overlapping widths L3 and L4 of the repair lines 110 and 120 may be different. That is, in a twisted nematic (TN) mode, if the twisting direction of the liquid crystal is counter-clockwise with respect to the lower TFT substrate 10 so that disclination occurs on the right side, the overlapping width L4 on the right side needs to be longer than the overlapping width L3 on the left side to ensure the repair lines 110 and 120 to cover the entire disclination region.

The third embodiment increases the aperture ratio more effectively in a vertical alignment (VA) LCD mode. Since the disclination region in the VA mode is narrower than in other modes, the right-side overlapping width L4 of the repair lines 110 and 120 does not need to be extended.

Figure 8:
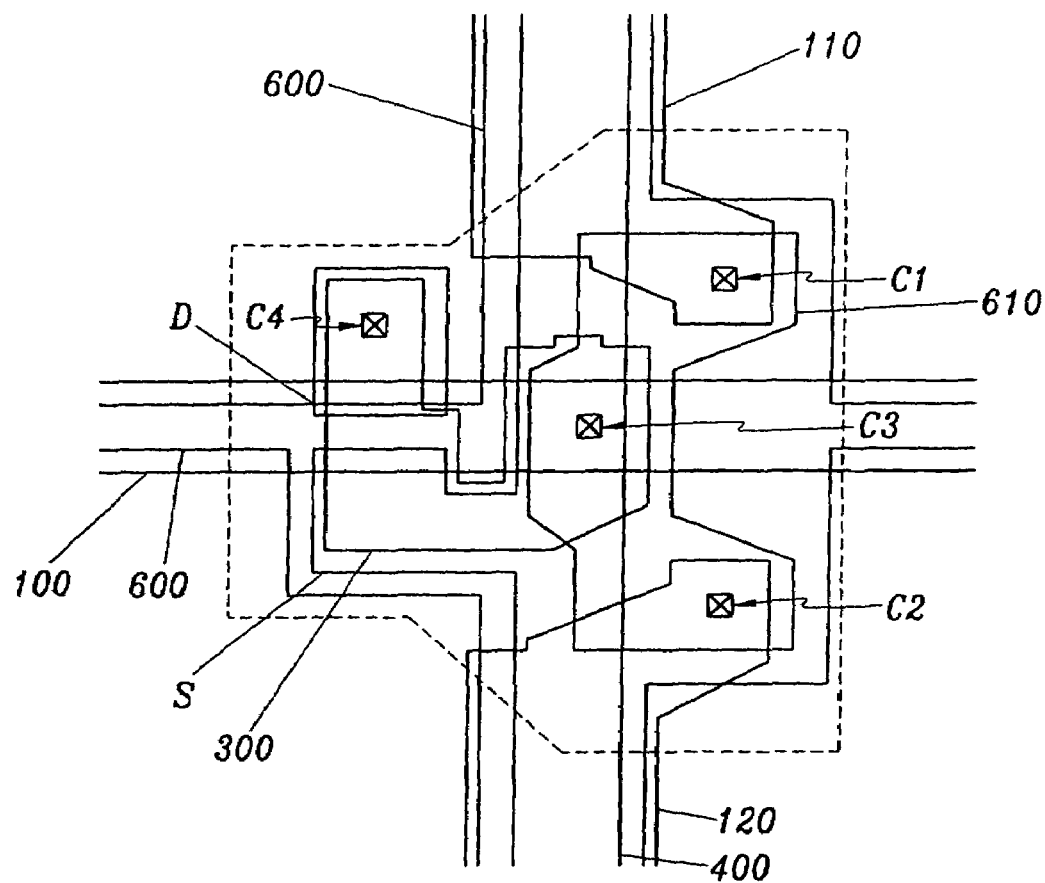
FIG. 8 is a layout view of an LCD according to a fourth embodiment of the present invention.

FIG. 8 shows a layout view of an LCD according to a fourth embodiment of the present invention. Here, a pixel electrode 600 is expanded and overlaps a gate line 100. Except for the structure of the pixel electrode 600, the remaining configuration of the LCD is identical to the third embodiment.

In the fourth embodiment, the gate line 100 and repair lines 110 and 120 cover the misalignment region of the liquid crystal extending outside the pixel electrode 600 along the edges of a data line 400 and the gate line 100 since the pixel electrode 600 overlaps the repair line 110 and 120 as well as the gate line 100.

Thus, a black matrix (BM) may be formed on an upper substrate 20 in a manner corresponding to the intersecting portion of the gate line 100 and the data line 400 and the TFT. As a result, the aperture ratio is improved.

Figure 9:
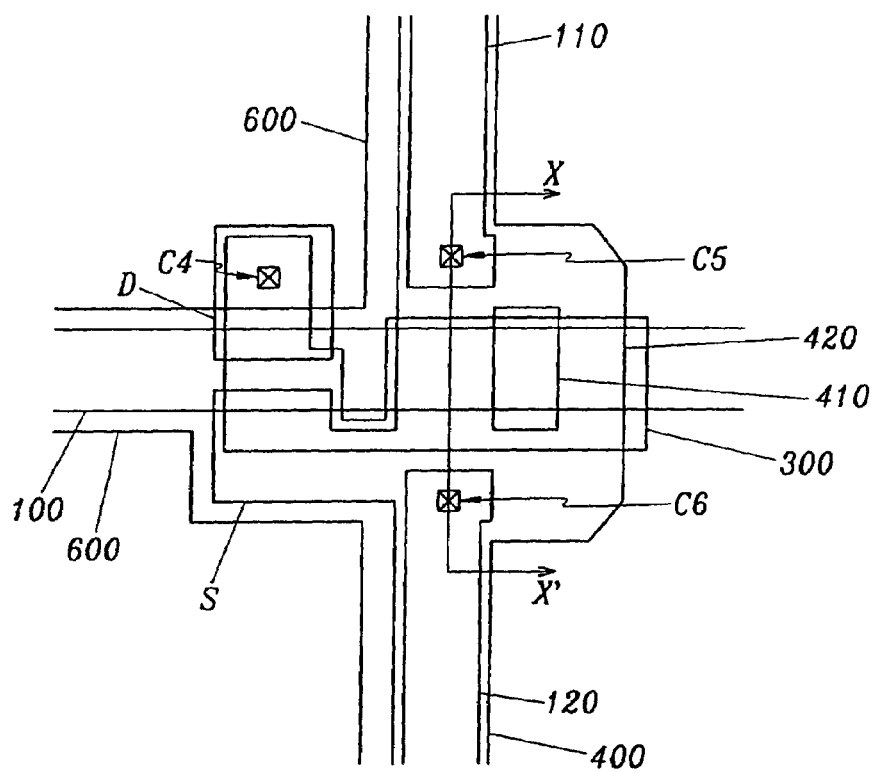
FIG. 9 is a layout view of an LCD according to a fifth embodiment of the present invention.
Figure 10:
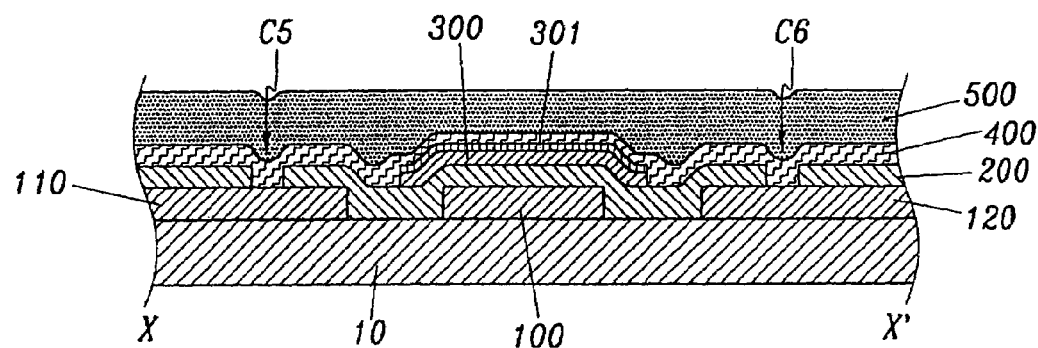
FIG. 10 is a cross-sectional view taken along line X-X' of FIG. 9.

FIG. 9 is a layout view of an LCD having a repair line according to a fifth embodiment of the present invention, and FIG. 10 is a cross sectional view taken along line X-X' of FIG. 9. In the fifth embodiment, it is possible to repair the disconnection of data lines without the use of a transparent connecting pattern.

A gate line 100, a semiconductor layer 300, an Ohmic contact layer 301, repair lines 110 and 120 and a transparent pixel electrode 600 are configured identically as in the previous embodiments.

As shown in FIGS. 9 and 10, the repair lines 110 and 120, made of the same material as the gate line 100 on the same layer, are formed straight and are connected to a data line 400 through contact holes C5 and C6 made in a gate insulating film 200. If the data line 400 is not connected to the repair lines 110 and 120, the repair lines 110 and 120 are shorted to the data line 400 by laser irradiation only when the data line 400 is disconnected.

The data line 400 splits to form 410 and 420 where the data line 400 intersects the gate line 100. With this structure, if one of the branches 410 and 420 is disconnected at the intersection, signals are transmitted through the other branches. Therefore, the transparent connecting pattern 610 is not necessary in this embodiment. Except for the data line 400 and the repair lines 110 and 120, the structure of this embodiment is the same as in the previous embodiments.

Figure 11:
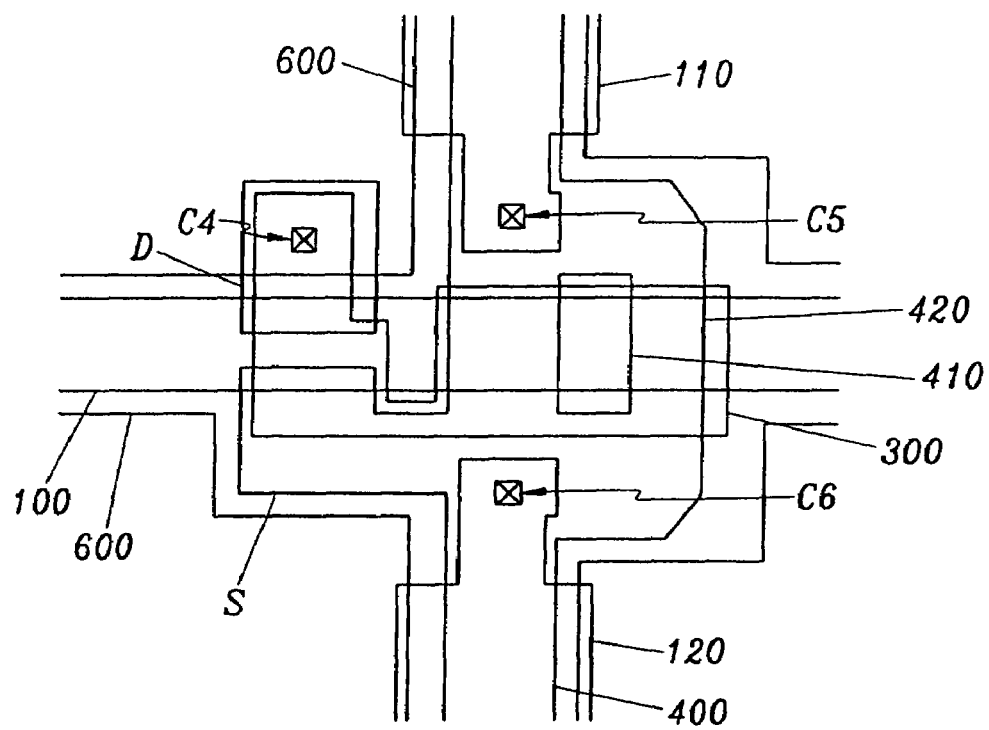
FIG. 11 is a layout view of an LCD according to a sixth embodiment of the present invention.

FIG. 11 is a layout view of an LCD according to a sixth embodiment of the present invention. Here, the structure of the LCD is identical to fifth embodiment except repair lines 110 and 120. That is, the repair lines 110 and 120 are formed wider than the width of a data line 400 and overlap the edges of a pixel electrode 600 to cover the misalignment of the liquid crystal occurring along the data line 400.

The structure of repair lines according to a seventh embodiment of the present invention will now be described.

Figure 12:
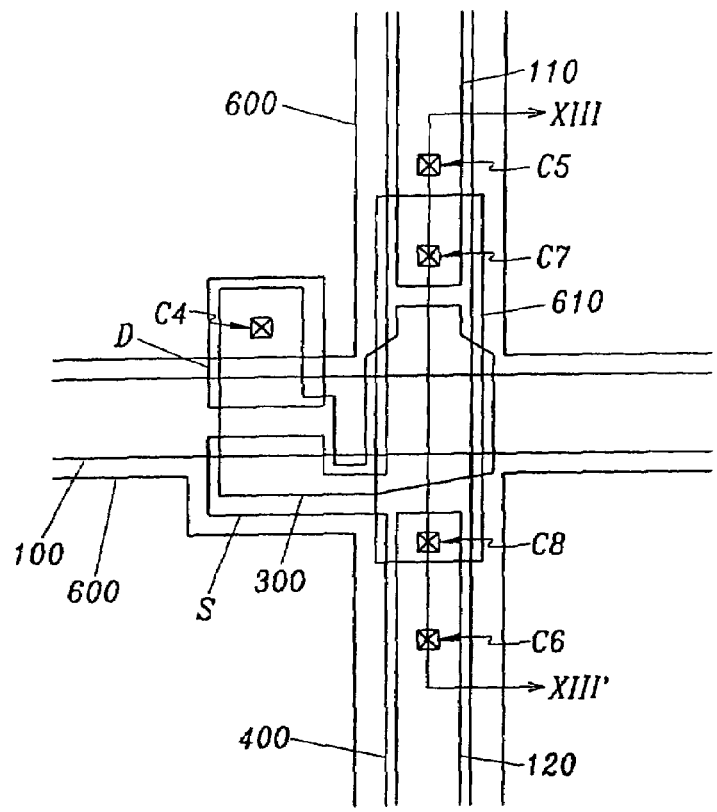
FIG. 12 is a layout view of an LCD according to a seventh embodiment of the present invention.
Figure 13:
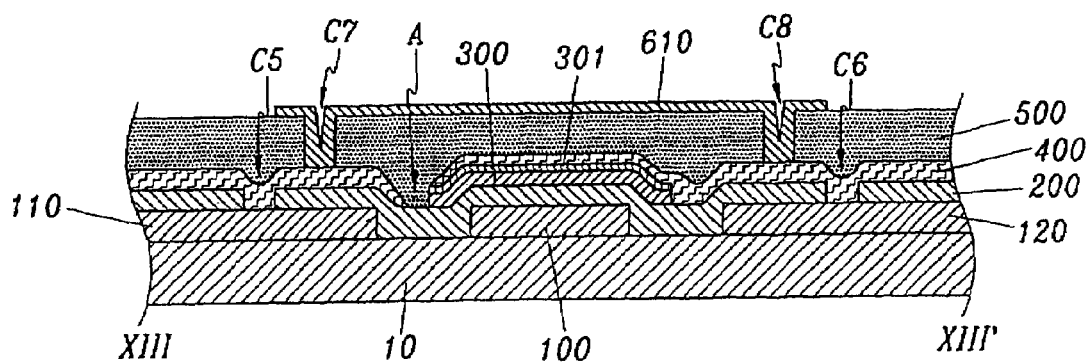
FIG. 13 is a cross-sectional view taken along line XIII-XIII' of FIG. 12.

FIG. 12 shows a layout view of an LCD according to the seventh embodiment of the present invention and FIG. 13 is a cross-sectional view taken along line XIII-XIII' of FIG. 12.

As shown in FIGS. 12 and 13, a data line 400 is formed along repair lines 110 and 120 in a vertical direction and connected to the same through contact holes C7 and C8 formed in a gate insulating film 200. A passivation film 500 is formed on the data line 400 and a transparent connecting pattern 610 is formed on the passivation film 500 from the end of one repair line 110 to the end of the other repair line 120 such that the portion where a gate line 100 intersects the data line 400 is covered. The transparent connecting pattern 610 is made of the same material as a pixel electrode 600 and is connected to the data line 400 through the contact holes the C7 and C8.

At portions at which a plurality of layers of the gate line 100, the gate insulating film 200, a channel layer 300 and the data line 400 are formed, the disconnection of the data line 400 (A) occurs easily where these lines overlap. However, if the secondary conductive connecting pattern 610 is formed over the data line 400 as in the seventh embodiment, data signals can be transmitted through the connecting pattern 610.

Figure 14:
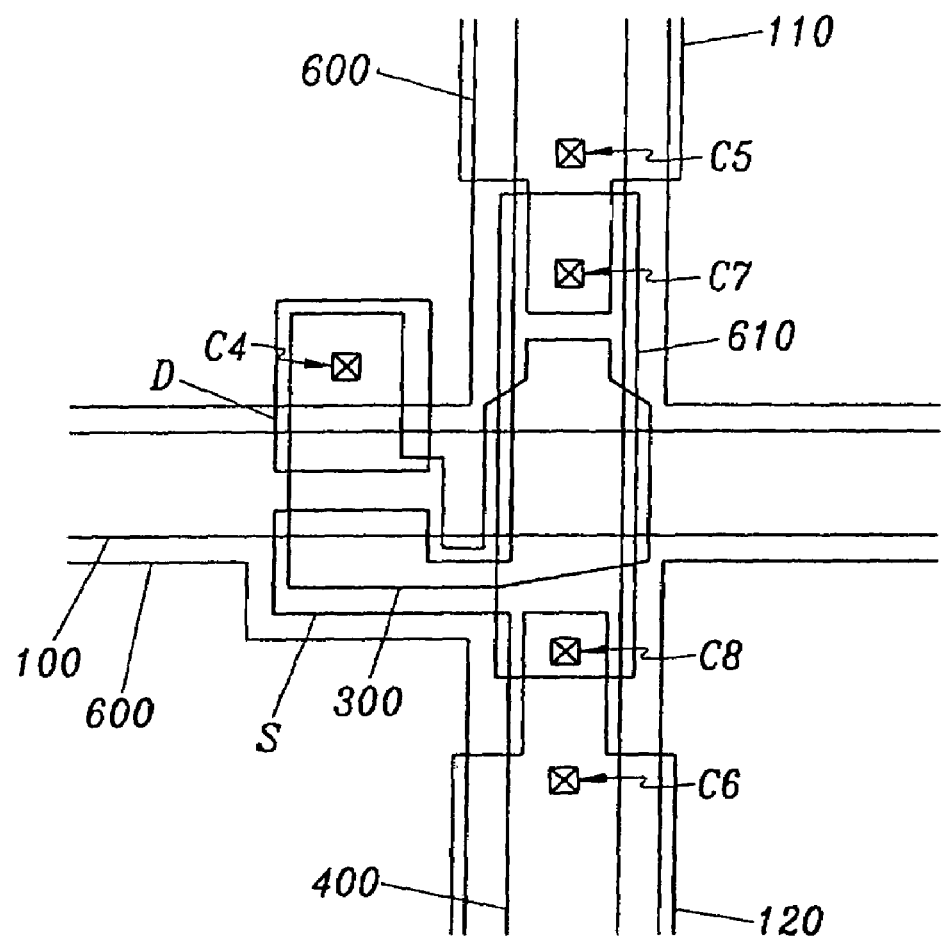
FIG. 14 is a layout view of an LCD according to an eighth embodiment of the present invention.

FIG. 14 shows a layout view of an LCD according to an eighth embodiment of the present invention. Here, the LCD is structured substantially the same as the seventh embodiment except for repair lines 110 and 120. The repair lines 110 and 120 are wider than a data line 400 and overlap a pixel electrode 600 to function as a black matrix to cover the misalignment of the liquid crystal. As a result, the aperture ratio is increased.

The method of manufacturing LCDs according to the preferred embodiments of the present invention will be described hereinafter.

Figure 15A:
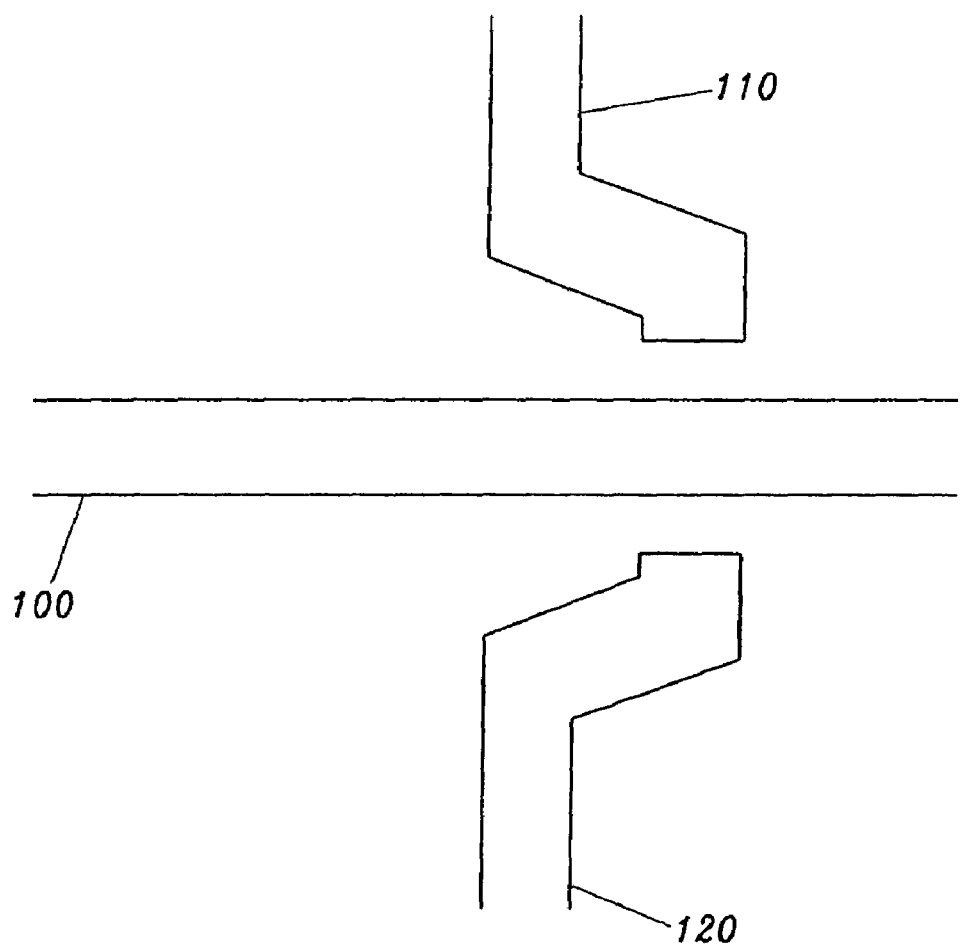
FIGS. 15A to 15E are layout views of the LCD of the first embodiment illustrating consecutive steps in a manufacturing method of the same.
Figure 15B:
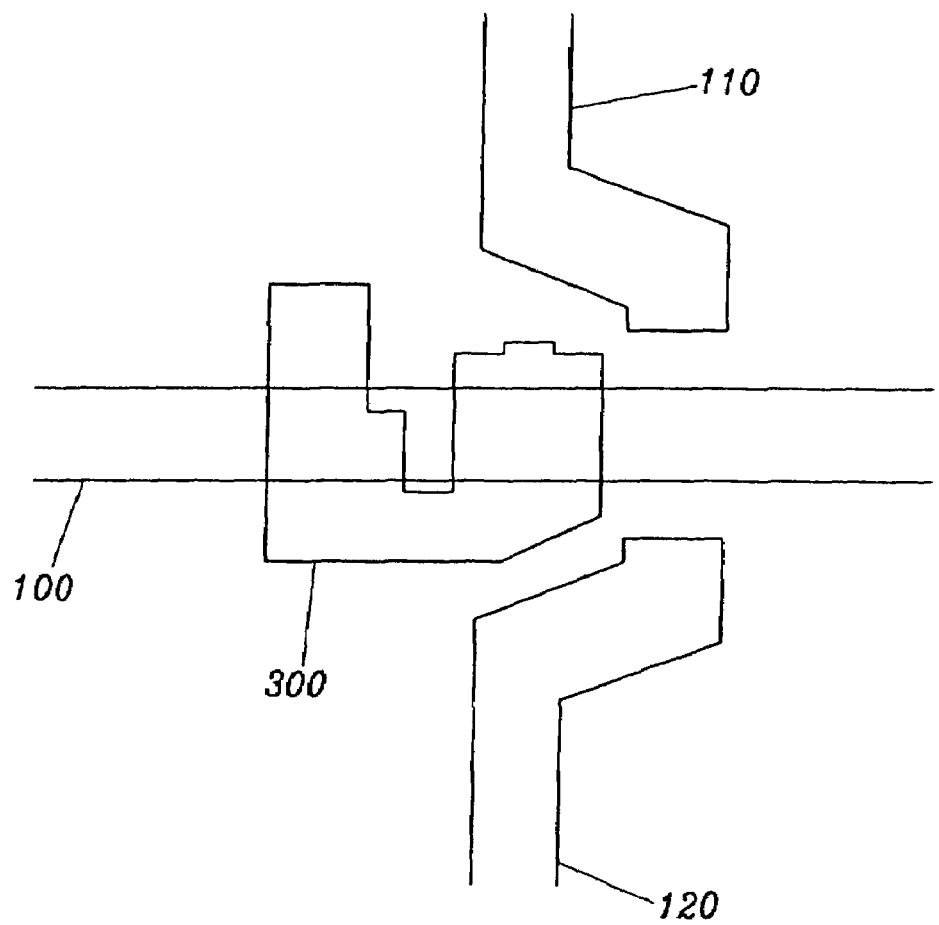
Figure 15C:
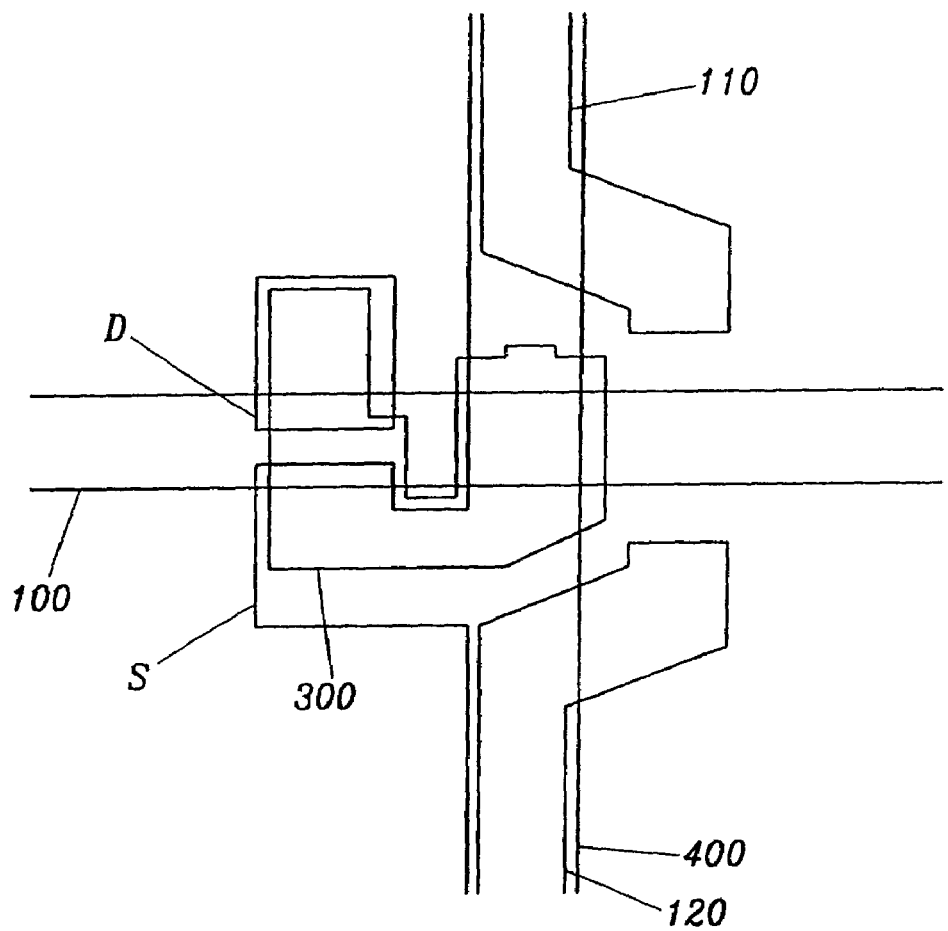

FIGS. 15A to 15C show layout views of the LCD of the first embodiment illustrating consecutive steps in a manufacturing method of the same. Here, the repair lines are formed during a step of forming the gate wires, and the secondary connecting pattern is formed on overlapping portions of the data lines and the gate lines during a step of forming the pixel electrode. In this method, the secondary connecting pattern connects the data line to the repair lines through the contact holes.

As shown in FIG. 15A, a metal layer for gate wires such as aluminum (Al) or molybdenum (Mo) is deposited and patterned to form the gate line 100 and the repair lines 110 and 120.

As shown in FIG. 15B, silicon-nitride (SiNx) is deposited to form the gate insulating film 200, and amorphous silicon and n+ amorphous silicon are deposited thereon in sequence and then patterned to form the semiconductor layer 300 and the n+ amorphous silicon layer 301, respectively, over the gate line 100.

As shown in FIG. 15C, a metal layer such as chrome (Cr) for data wires is deposited and patterned to form the data wires such as the data line 400, the source electrode (S), and the drain electrode (D). Next, an exposed portion of the n+ amorphous silicon layer is removed to form the Ohmic contact layer 301.

Figure 15D:
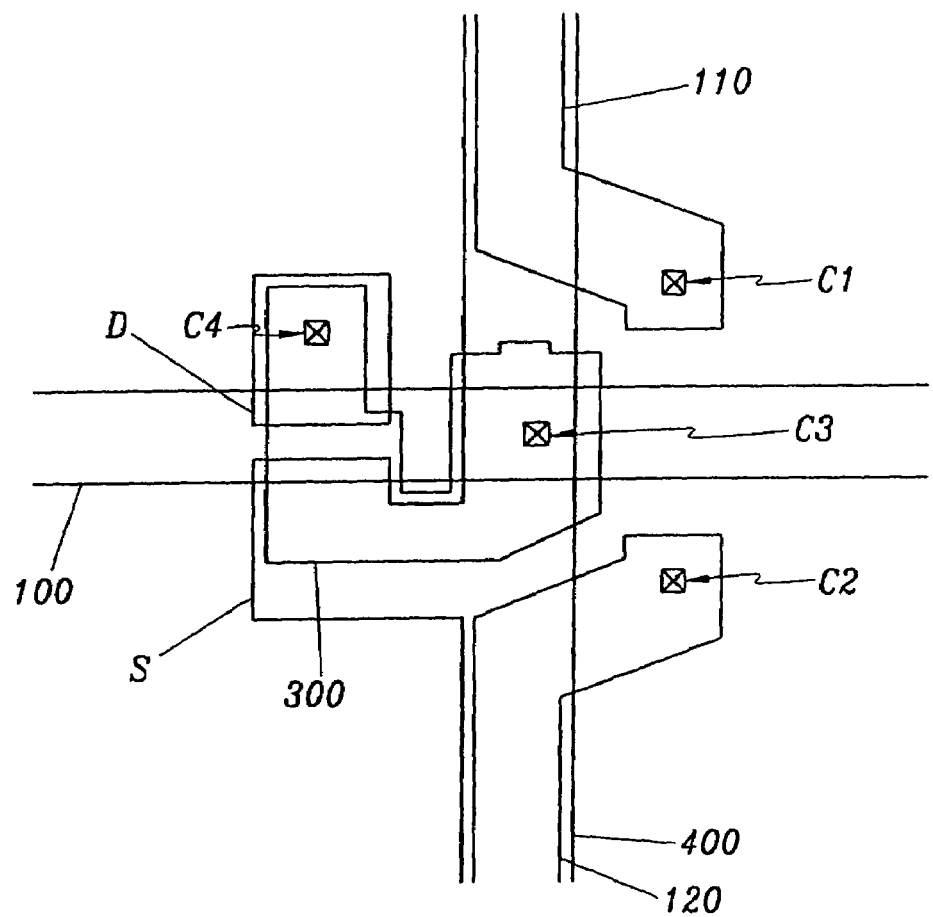

As shown in FIG. 15D, the passivation film 500 is formed thereon. Portions of the gate insulating film 200 and the passivation film 500 over both edges of the repair lines 110 and 120 are removed to form the contact holes C1 and C2, and portions of the passivation film 500 over the data line 400 and the drain electrode D are removed to form the contact holes C3 and C4.

Figure 15E:
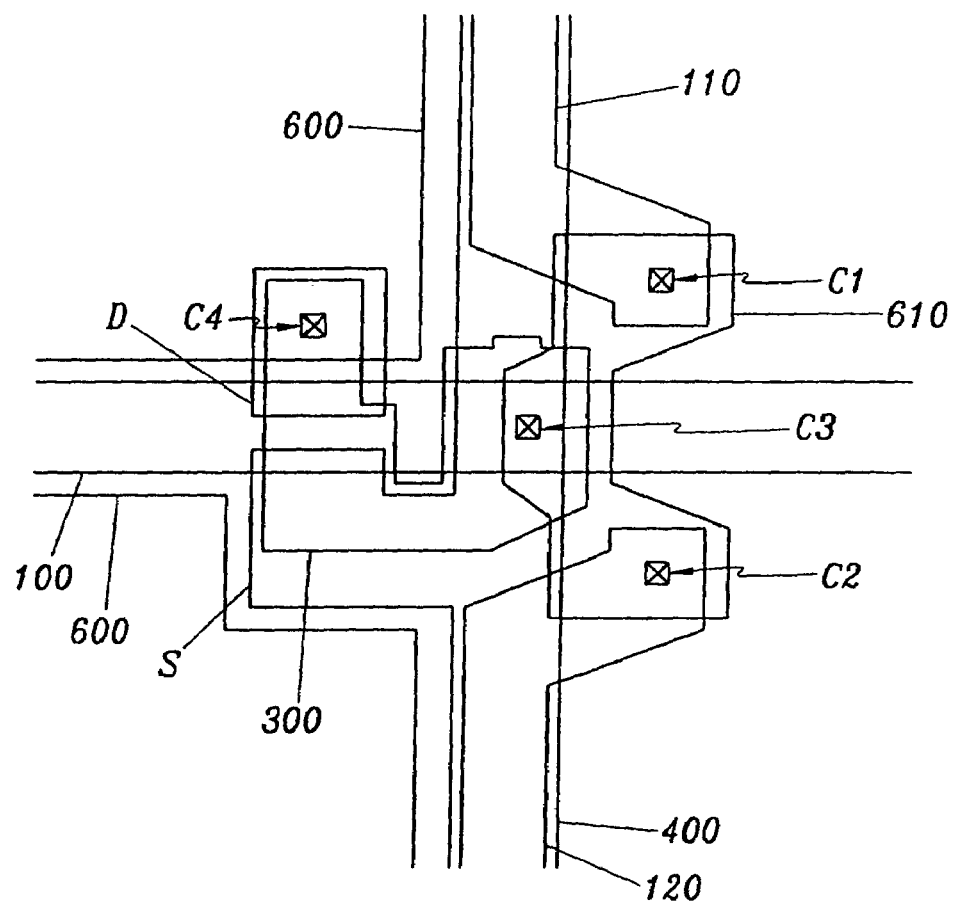

As shown in FIG. 15E, ITO is deposited and patterned to form the pixel electrode 600 and the connecting pattern 610. In this step, the pixel electrode 600 is connected to the drain electrode (D) through the contact hole C4, and the connecting pattern 610 connects the repair lines 110 and 120 to the data line 400 through the contact holes C1, C3 and C2. Finally, the repair lines 110 and 120 are electrically connected to the data line 400.

FIGS. 16A to 16E show layout views of the LCD of the third embodiment illustrating consecutive steps in a manufacturing method of the same.

Repair lines 110 and 120 are formed in a step of forming a gate line 100, and a secondary connecting pattern, which connects to the repair lines 110 and 120 through contact holes C1 and C2, is formed on overlapping portions of the data line 400 and the gate line 100 in a step of forming the pixel electrode 600.

Figure 16A:
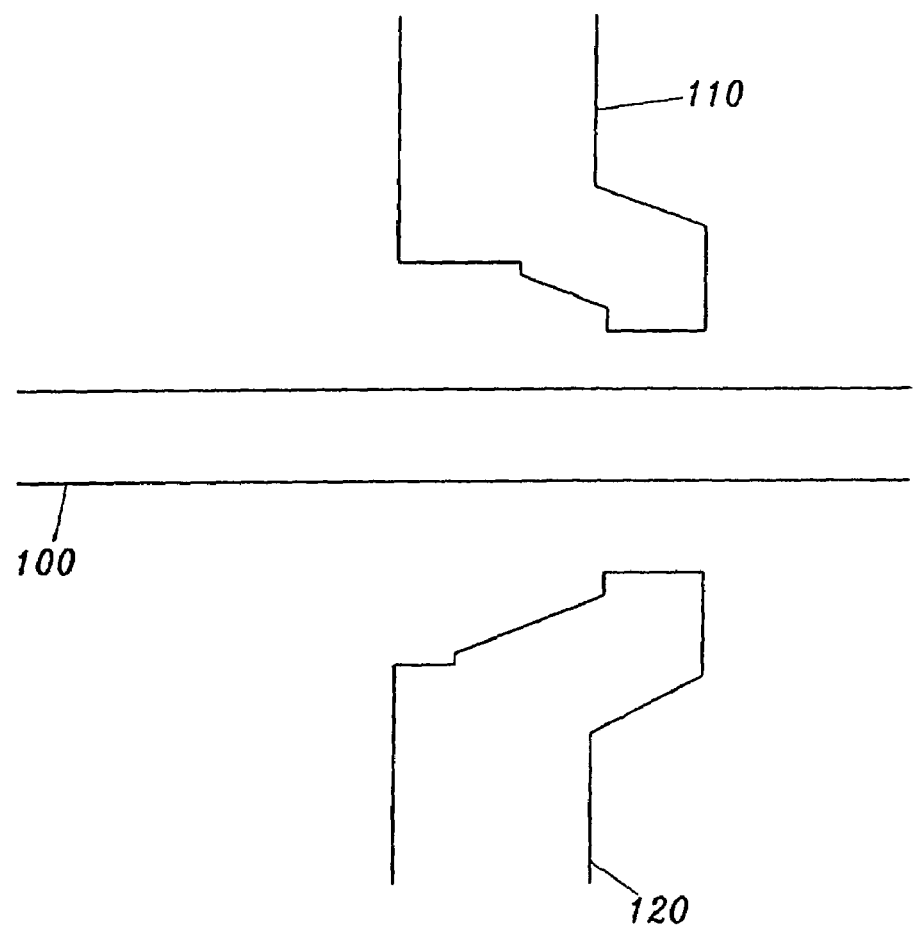
FIGS. 16A to 16E are layout views of the LCD of the third embodiment illustrating consecutive steps in a manufacturing method of the same.
Figure 16B:
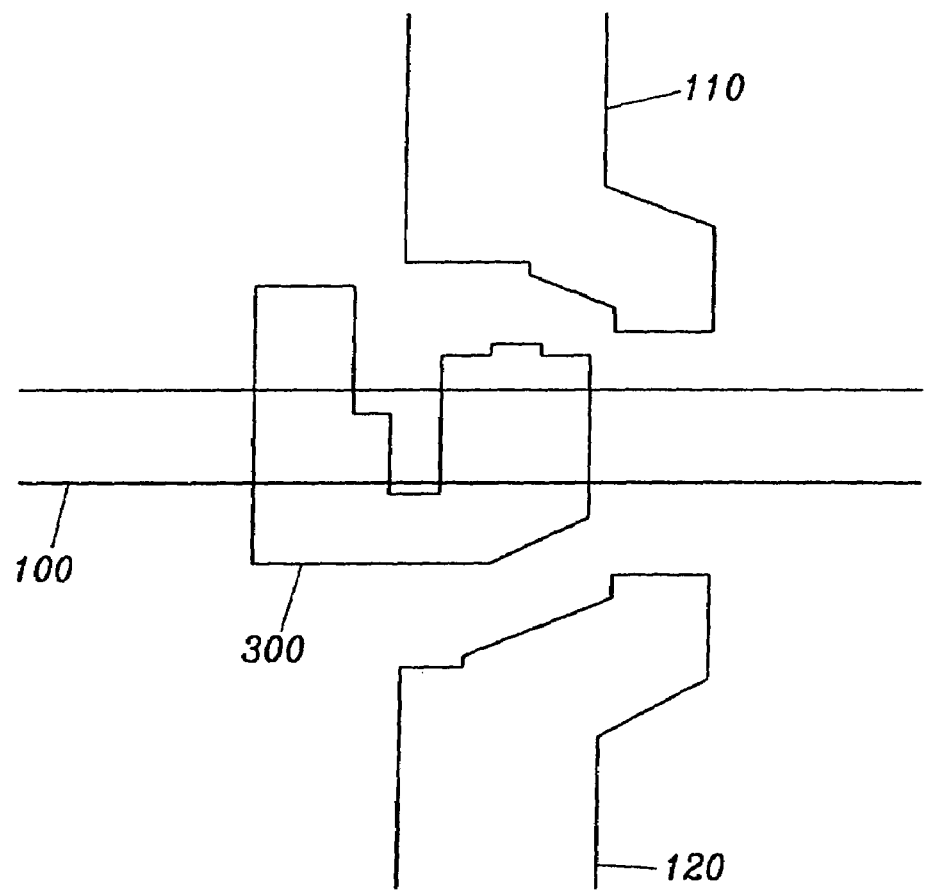
Figure 16C:
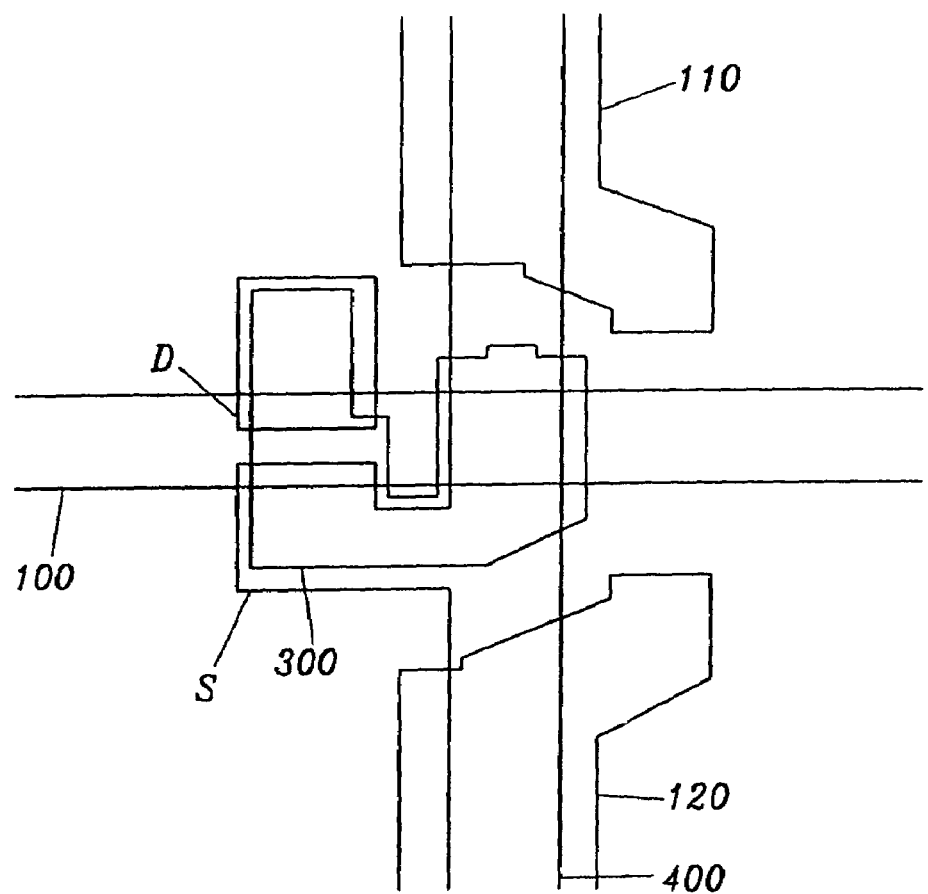
Figure 16D:
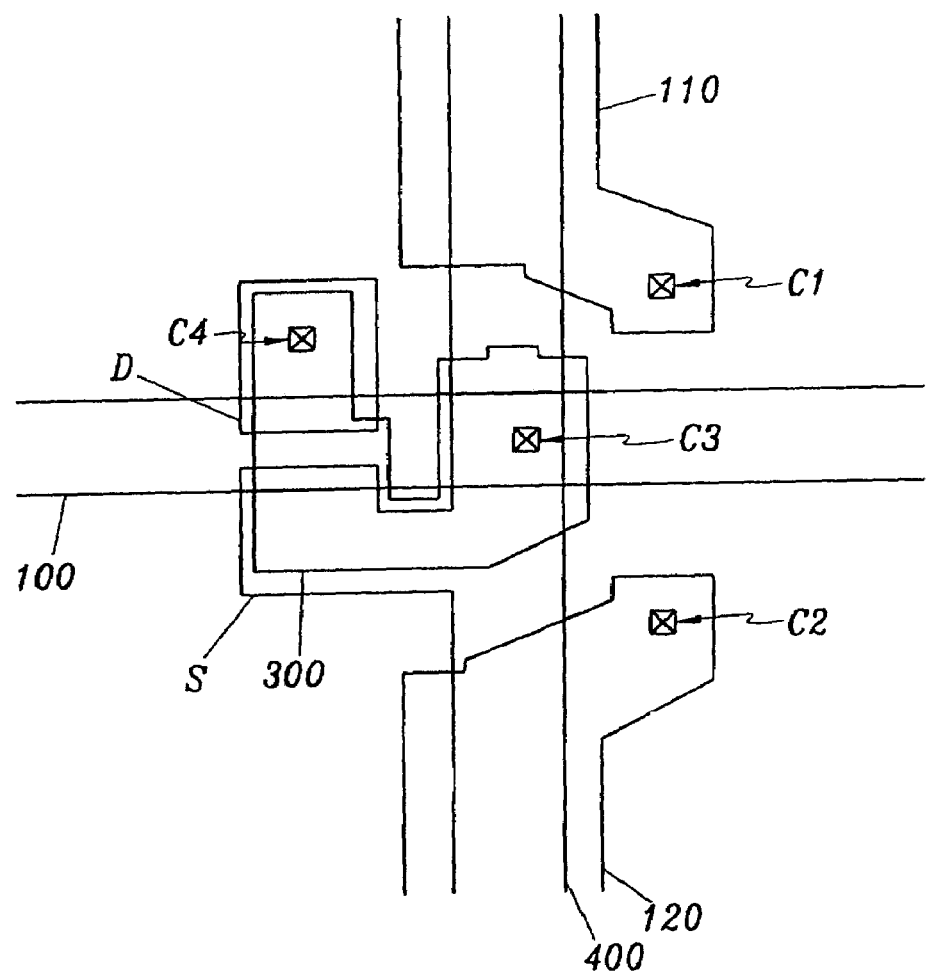
Figure 16E:
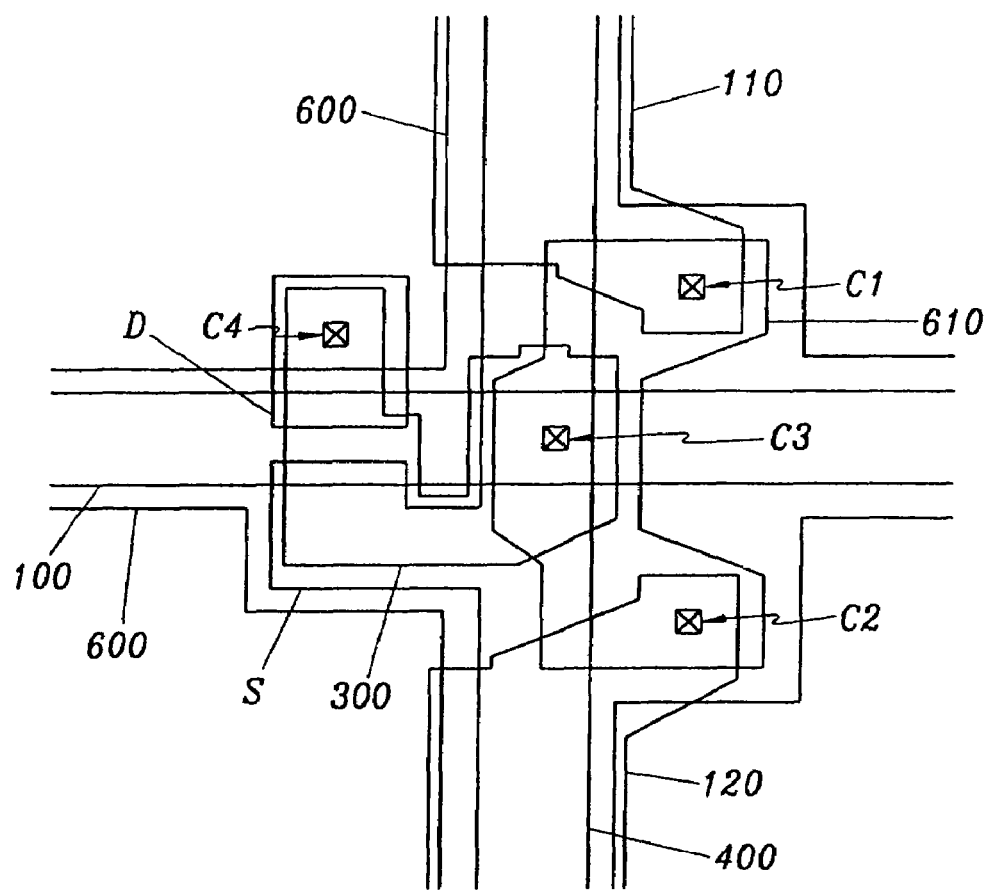

As shown in FIGS. 16C to 16E, this method is different from the method mentioned above in that the repair lines 110 and 120 are formed narrower than the width of the data line 400, and the pixel electrode 600 overlaps the repair lines 110 and 120 having the same or different widths on the right and the left sides. Here, the edges of the pixel electrode 600 may overlap the gate line 100 at the lower and upper sides to get the similar effect.

Figure 17A:
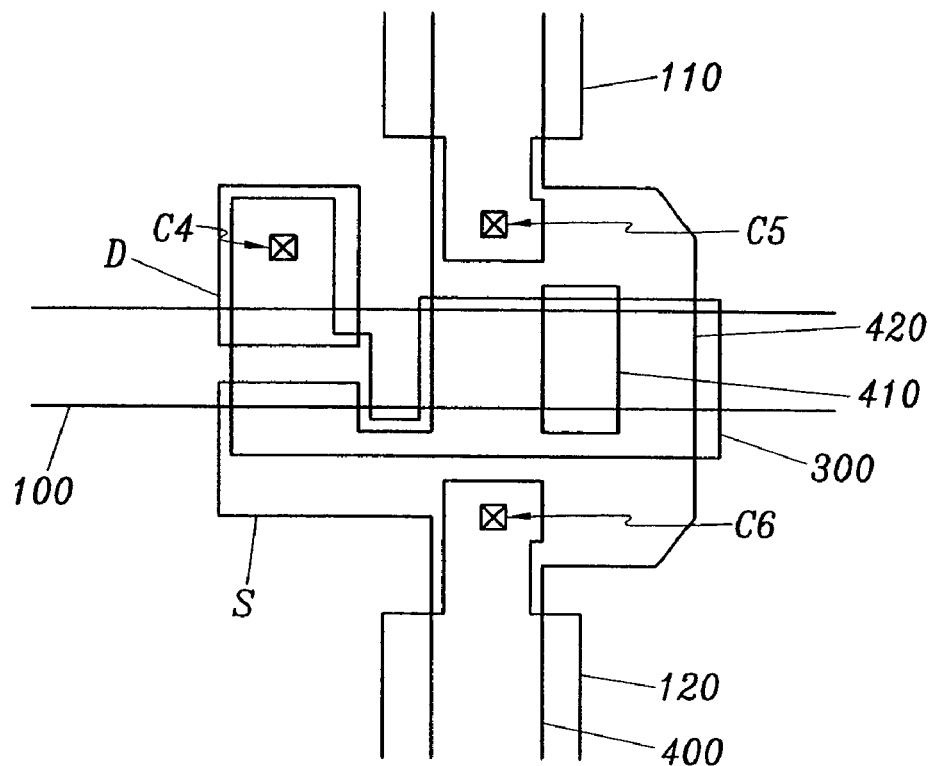
FIGS. 17A to 17B are layout views of the LCD of the fifth embodiment illustrating consecutive steps in a manufacturing method of the same.
Figure 17B:
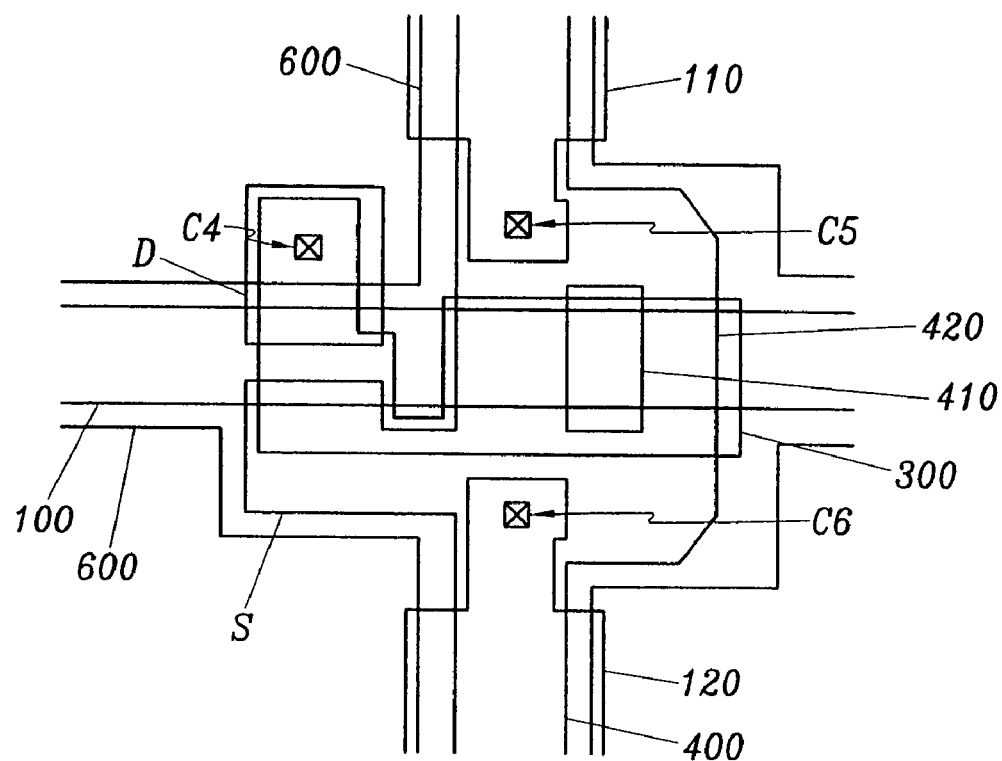

FIGS. 17A and 17B show layout views of the LCD of the fifth embodiment illustrating consecutive steps in a manufacturing method of the same. In the LCD of the fifth embodiment, the repair lines 110 and 120 are formed in a step of forming the gate line 100 such that the repair lines 110 and 120 are electrically connected to the data line 400 through contact holes C5 and C6, and the data line 400 is split into two branch lines 410 and 420 at portions where the data line 400 intersects the gate line 100.

In more detail, the gate line 100 and the repair lines 110 and 120 are formed in the same step. Next, a gate insulating film 200, the amorphous silicon layer 300, and the n+ amorphous silicon layer 301 are deposited thereon in sequences, after which two layers, the amorphous silicon layer 300 and n+ amorphous silicon layer 301 are patterned. Subsequently, the gate insulating film 200 is patterned to form the contact holes C5 and C6 over the repair lines 110 and 120.

Next, as shown in FIG. 17A, a metal for data wires is deposited and patterned to form the data line 400, a source electrode (S), and a drain electrode (D). In the process, the data line 400 is formed to be divided into the two branch lines 410 and 420 at portions where the data line 400 intersects the gate line 100, the two branch lines 410 and 420 being connected to the repair lines 110 and 120 through the contact holes C5 and C6. Next, a passivation film 500 is deposited thereon and patterned to form the contact hole C4 to reveal the drain electrode D.

As shown in FIG. 17B, a transparent conductive material such as ITO is deposited thereon and patterned to form the pixel electrode 600. In this process, the pixel electrode 600 contacts the drain electrode (D) through the contact hole C4.

Figure 18A:
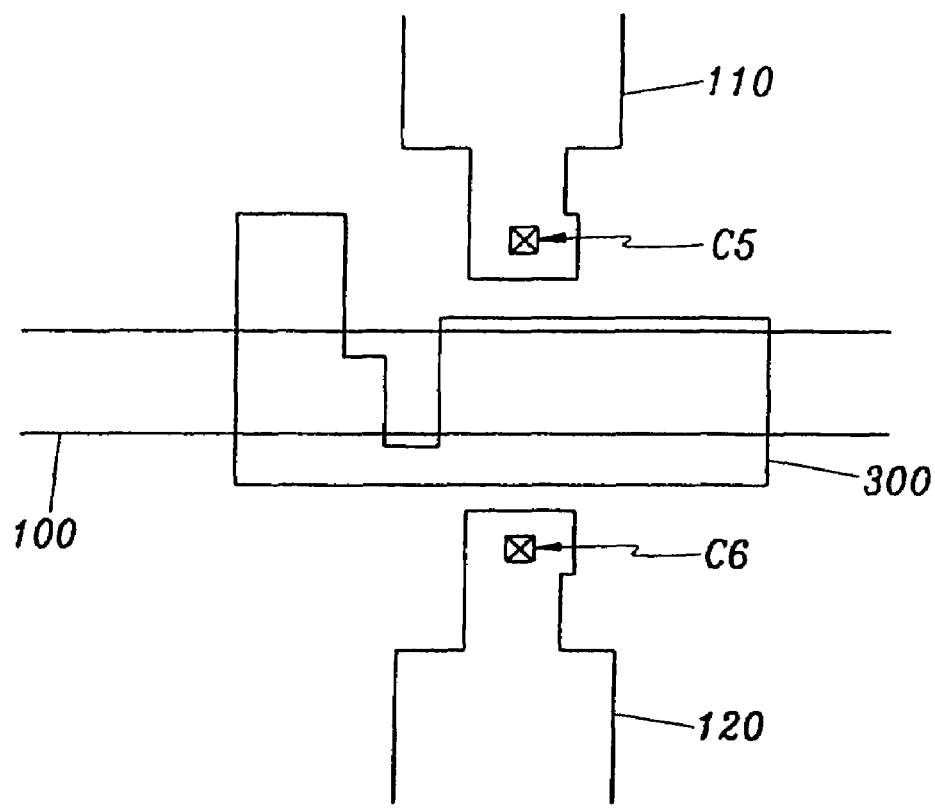
FIGS. 18A to 18C are layout views of the LCD of the sixth embodiment illustrating consecutive steps in a manufacturing method of the same.
Figure 18B:
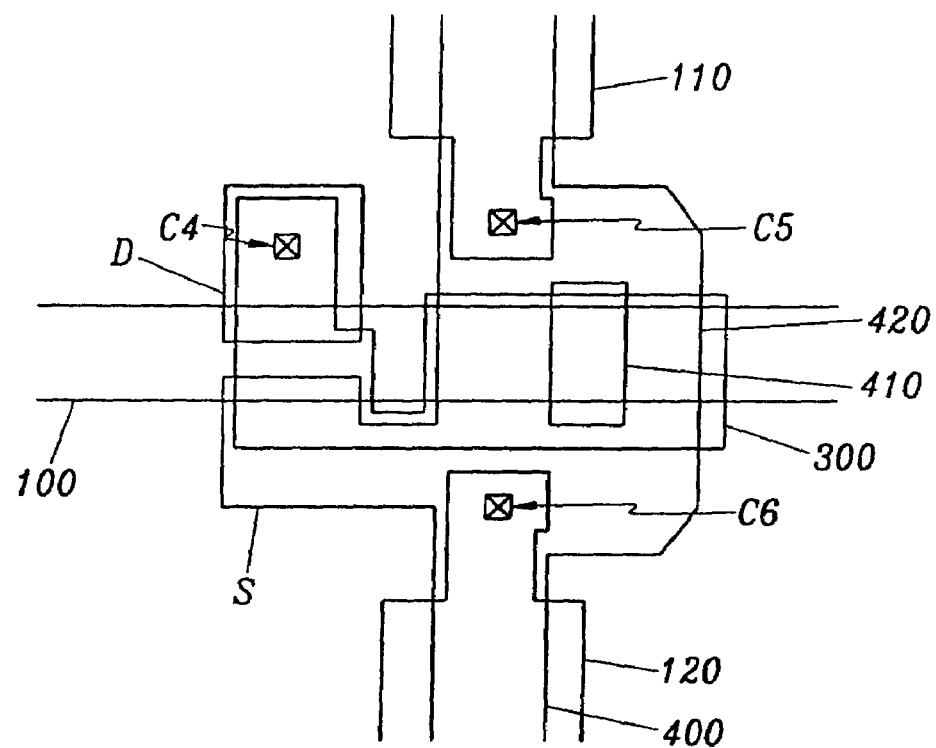
Figure 18C:
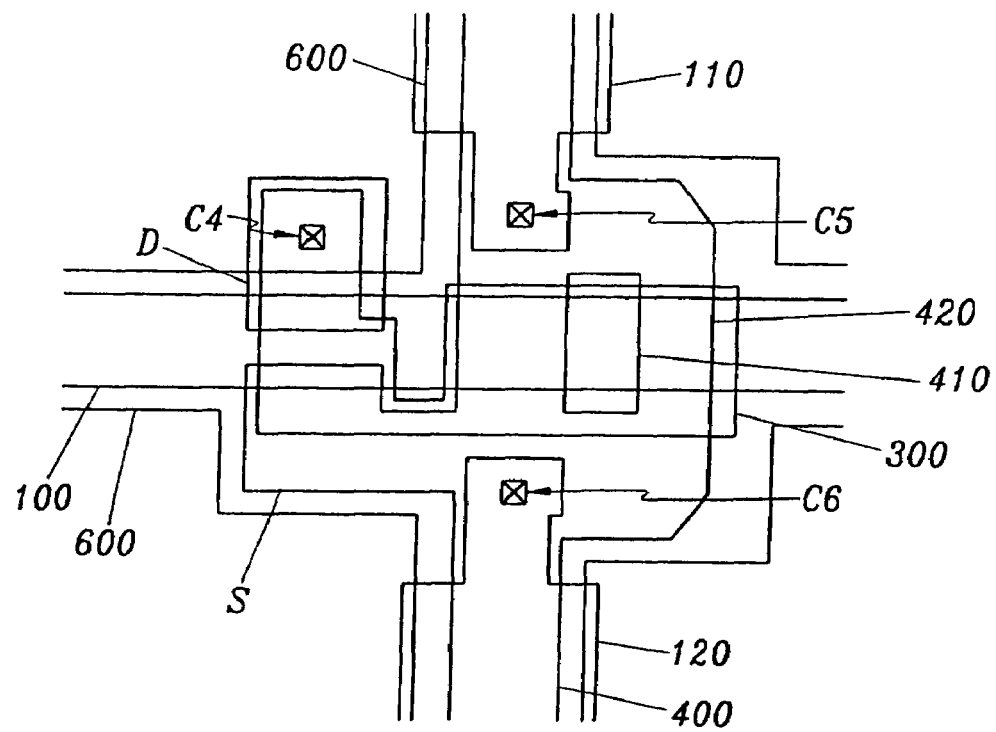

FIGS. 18A to 18C show layout views of the LCD of the sixth embodiment illustrating consecutive steps in a manufacturing method of the same. The method of manufacturing the LCD of the sixth embodiment is identical to the method of manufacturing the LCD of the fifth embodiment, described with reference to FIGS. 17A and 17B, except that the repair lines 110 and 120 are wider than the data line 400 such that the repair lines 110 and 120 overlap edges of the pixel electrode 600.

With reference to FIG. 18A, a gate line 100 and the repair lines 110 and 120 are formed in the same step, then a gate insulating film 200, an amorphous silicon layer 300, and an n+ amorphous silicon layer 301 are deposited thereon in sequence. Next, the amorphous silicon layer 300 and the n+ amorphous silicon layer 301 are patterned. Subsequently, the gate insulating film 200 is patterned to form contact holes C5 and C6 over the repair lines 110 and 120.

In FIG. 18B, a metal for data wires is deposited and patterned to form the data line 400, a source electrode (S), and a drain electrode (D). During this process, the data line 400 is patterned to be divided into two branch lines 410 and 420 at portions where the data line 400 intersects the gate line 100. The main branch line 410 is formed narrower than the repair lines 110 and 120 and is connected to the same through the contact holes C5 and C6.

As shown in FIG. 18C, a passivation film 500 is deposited thereon and patterned to form a contact hole C4 over the drain electrode D. A transparent conductive material such as ITO is then deposited thereon and patterned to form the pixel electrode 600. The pixel electrode 600 is formed to overlap the repair lines 110 and 120 and contacts the drain electrode (D) through the contact hole C4.

Figure 19A:
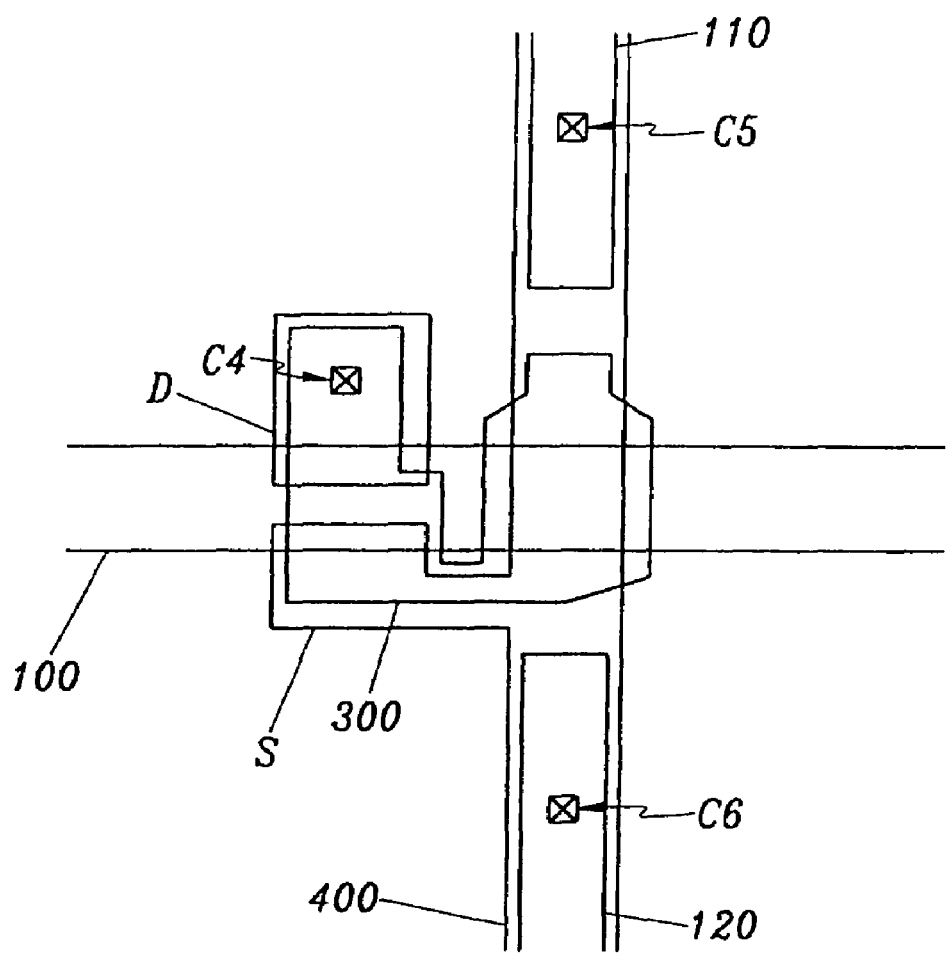
FIGS. 19A to 19C are layout views of the LCD of the seventh embodiment illustrating consecutive steps in a manufacturing method of the same.
Figure 19B:
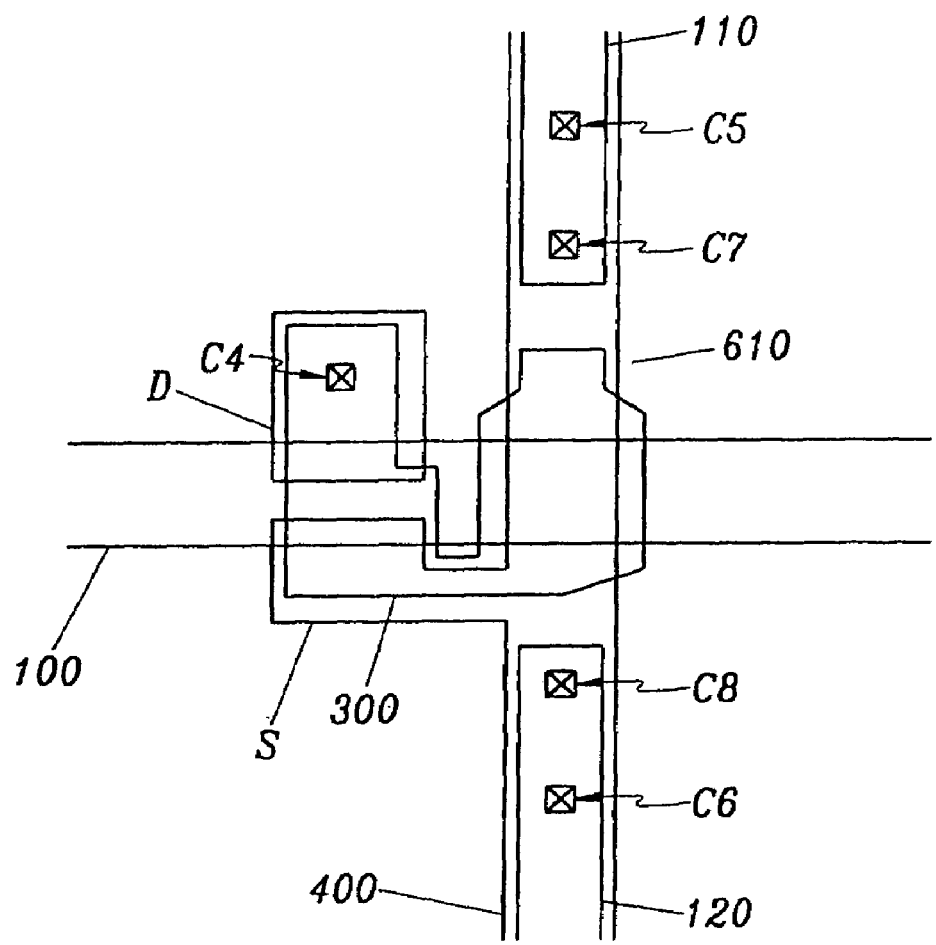
Figure 19C:
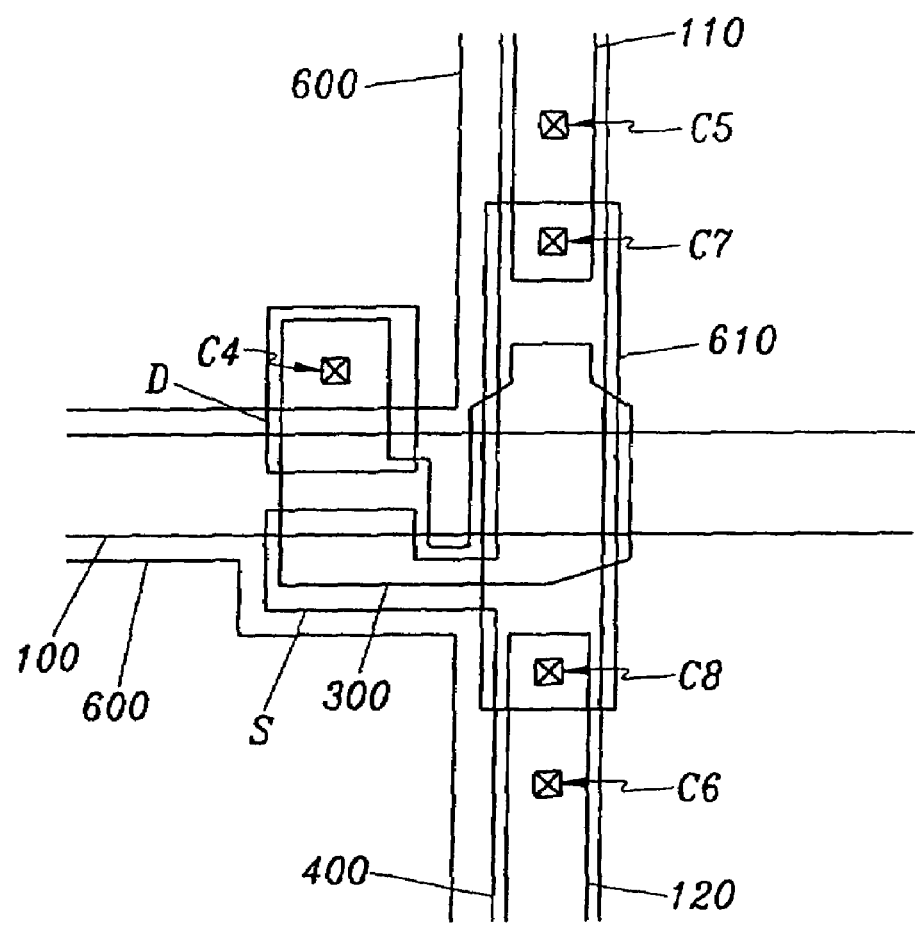

FIGS. 19A to 19C show layout views of the LCD of the seventh embodiment illustrating consecutive steps of the manufacturing method. In manufacturing the LCD of the seventh embodiment, the repair lines 110 and 120 are connected to the data line 400, and the transparent secondary connecting pattern 610, connected to the secondary lines through contact holes C7 and C8, is formed in a step of forming the pixel electrode 600.

As shown in FIG. 19A, the gate line 100, the repair lines 110 and 120, the gate insulating film 200, the amorphous silicon layer 300, and an n+ amorphous silicon layer 301 are formed in the same manner as that in the previously mentioned embodiments. Next, metal for data wires is deposited and patterned to form the data line 400, a source electrode (S), and a drain electrode (D). At this time, the data line 400 is connected to the repair lines 110 and 120 through contact holes C5 and C6.

As shown in FIG. 19B, the passivation film 500 is deposited thereon and patterned to form the contact holes C7 and C8, and a contact hole C4 to respectively reveal the data line 400 at both sides with respect to the gate line 100 and the drain electrode D.

Subsequently, with reference to FIG. 19C, a transparent conductive material such as ITO is deposited thereon and patterned to form the pixel electrode 600 and the secondary connecting pattern 610. In this process, the secondary connecting pattern 610 is patterned along the data line 400 overlapping the ends of the repair lines 110 and 120 and the intersecting portion between the gate line 100 and the data line 400, and connecting to the data line 400 through the contact holes C7 and C8.

Figure 20A:
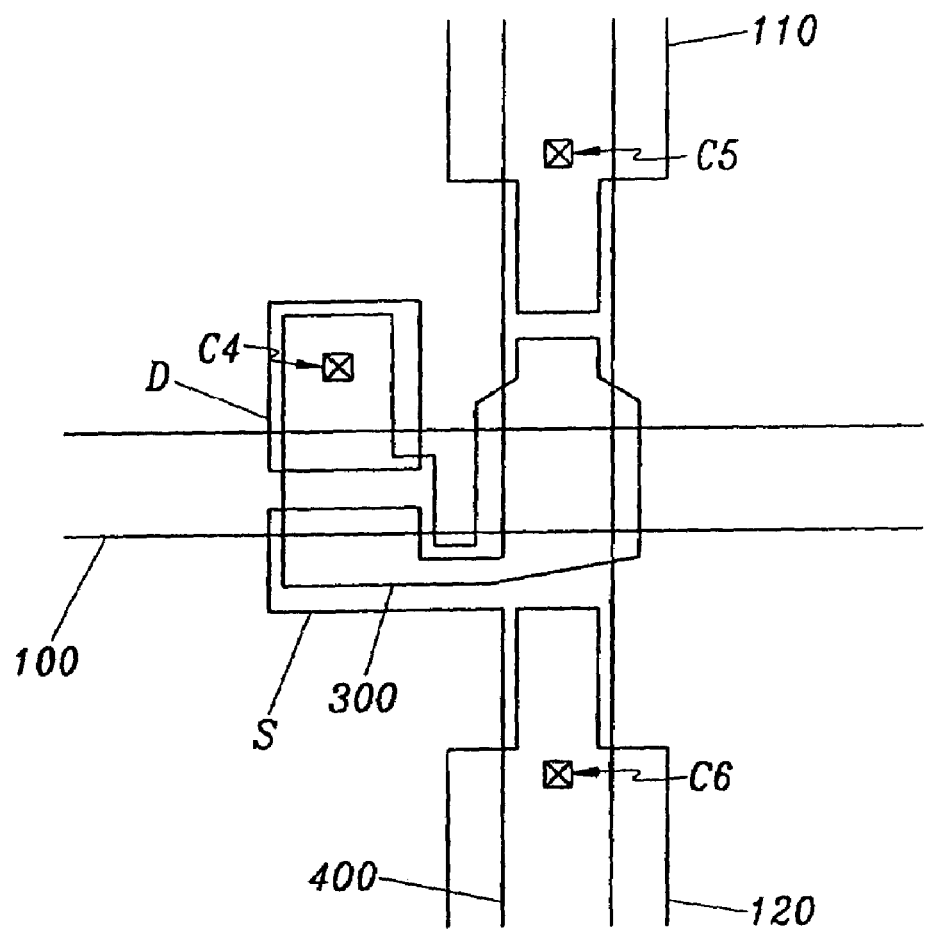
FIGS. 20A to 20C are layout views of the LCD of the eighth embodiment illustrating consecutive steps in a manufacturing method of the same.
Figure 20B:
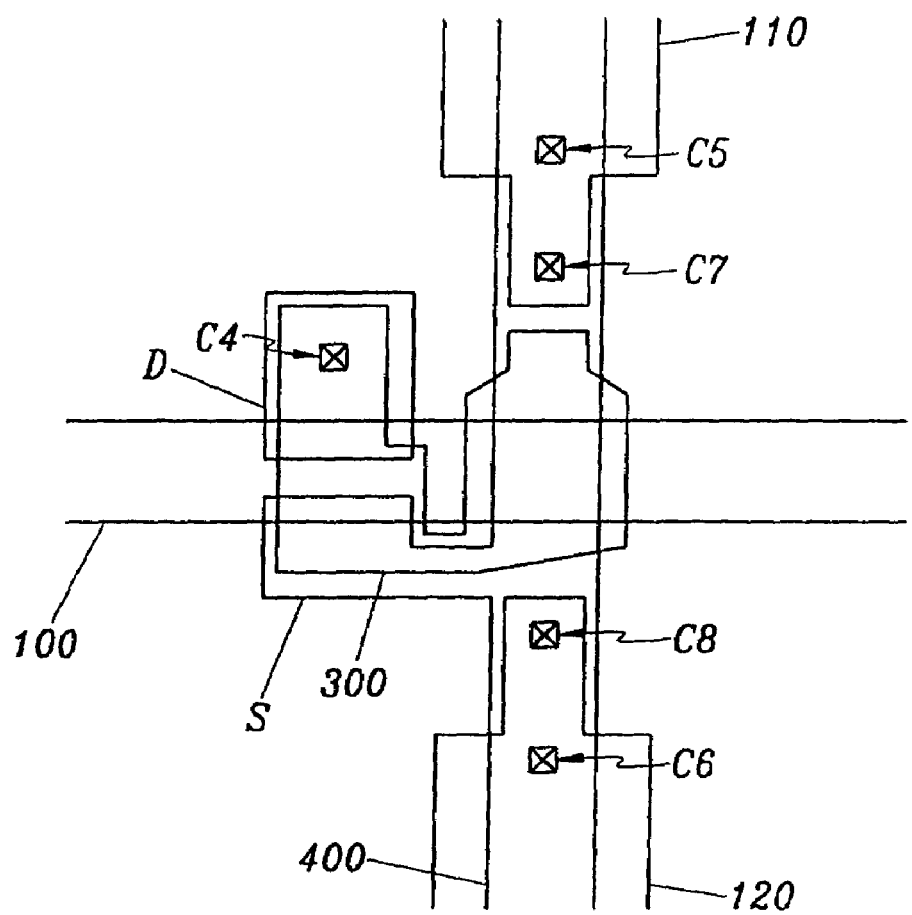
Figure 20C:
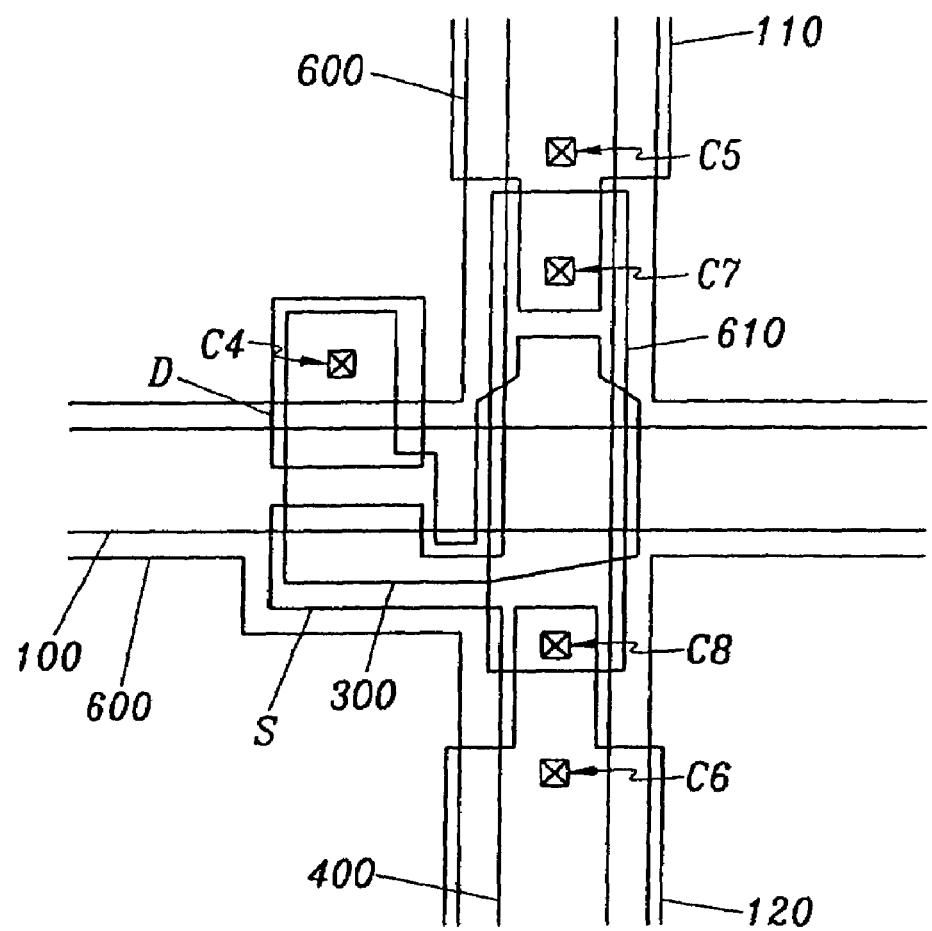

FIGS. 20A to 20C show layout views of the LCD of the eighth embodiment illustrating consecutive steps in a manufacturing method of the same. In the eighth embodiment, the manufacturing method is substantially the same as that of the seventh embodiment described with reference to FIGS. 19A to 19C.

In this method, the repair lines 110 and 120 are formed wider than the data line 400. Further, a transparent secondary connecting pattern 610, connected to the data line 400 through contact holes C7 and C8, is formed in a step of forming the pixel electrode 600.

In manufacturing the LCD of the eighth embodiment, the step of depositing the metal layer for forming the repair lines 110 and 120 and patterning the metal layer are not necessary since the repair lines 110 and 120 are formed while forming the gate wires. Thus, the process of manufacturing the LCD of the eighth embodiment is simplified.

In addition, it is not necessary to form a black matrix on an upper substrate 20 since the repair lines 110 and 120 are formed to be wider than the data line 400, thereby overlapping the edges of the pixel electrode 600. Accordingly, the repair lines 110 and 120 function as a black matrix, and the aperture ratio is increased.

Next, a liquid crystal display having the structure for preventing shorted circuit or disconnection defect of the gate and the data lines, such as double gate line structure, a connecting line and a secondary line structure is described.

Figure 21:
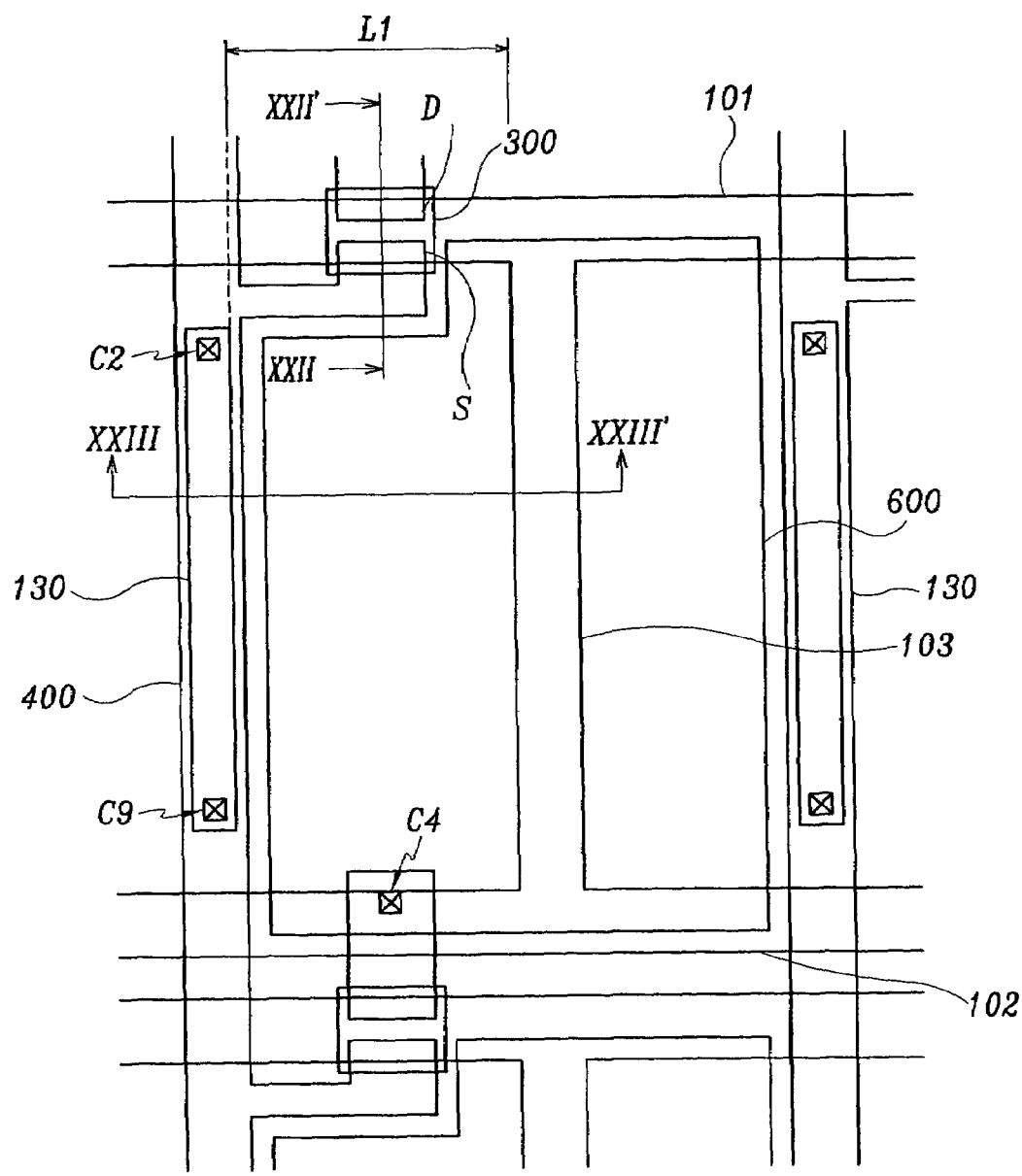
FIG. 21 is a layout view of the thin film transistor substrate according to the ninth embodiment of the present invention.
Figure 22:
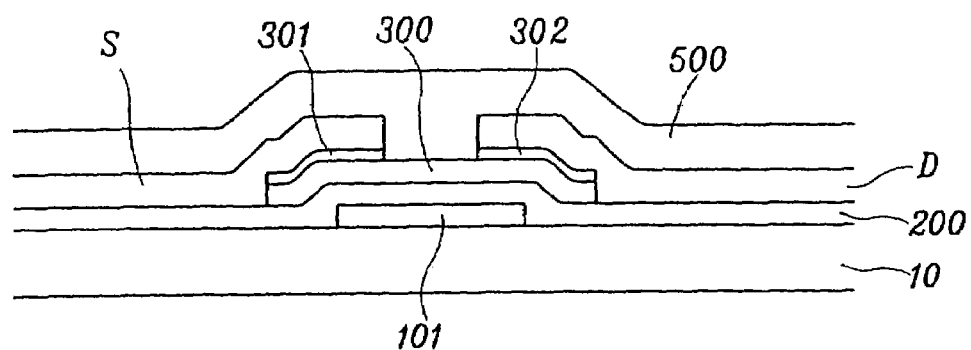
FIG. 22 is a cross sectional view taken along line XXII-XXII' in FIG. 21.
Figure 23:
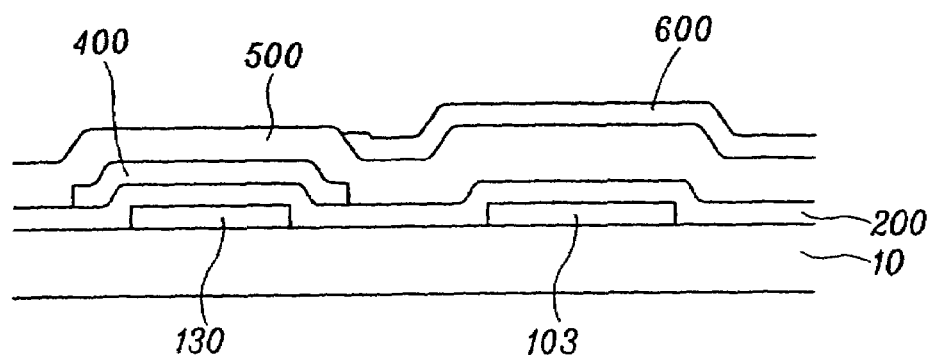
FIG. 23 is a cross sectional view taken along line XXIII-XXIII' in FIG. 21.

FIG. 21 is a layout view of the thin film transistor according to the ninth embodiment of the present invention, FIG. 22 is a cross sectional view taken along line XXII-XXII' in FIG. 22, and FIG. 23 is a cross sectional view taken along line XXIII-XXIII' in FIG. 22.

As shown in FIGS. 21 to 23, the first gate line 101 and the second gate line 102 parallel to each other are formed in a horizontal direction, a connecting line 103 which links the first gate line 101 and the second gate line 102 is formed across the center of a pixel region in a vertical direction. A secondary line 130 for preventing disconnection defects of the data lines is formed in the vertical direction.

A gate insulating film 200 covers the first gate line 101, the second gate line 102, the gate connecting line 103 and the secondary line 130. A semiconductor layer 300 is formed on the gate insulating film 200 over the first gate line 101. An ohmic contact layer 301 for improving the electric contact characteristics is formed on the semiconductor layer 300 at both sides with respect to the first gate line 101, and a source electrode S and a drain electrode D are formed on the contact layer 301. A data line 400 which is connected to the source electrode S is formed on the gate insulating film 200 in a vertical direction, and the data line 400 is connected to the secondary line 130 through contact holes C9 and C10.

A passivation film 500 covers the semiconductor layer 300, the data line 400, and the source and the drain electrodes S and D. A contact hole C4 through which the drain electrode D is exposed is made in the passivation film 500.

A transparent pixel electrode 600 is formed in the pixel region which is defined by the double gate lines 101 and 102 and the data line 400, and connected to the drain electrode D of the previous pixel through the contact hole C4.

In the LCD according to the ninth embodiment of the present invention, since the connecting line 103 is located inside the pixel region, the distance L1 from the connecting line 103 to the secondary line 130 is maximized. Therefore, signal delays due to the coupling capacitance are decreased. Moreover, the connecting line 103 is not connected to the secondary line 130 by any conductive contaminant while forming the gate wire such as the gate lines 101 and 102 and the connecting line 103, and the secondary line 130.

The tenth embodiment of the present invention illustrates the structure for reducing short-circuited defects between the gate line and the data line, in which the connecting lines are not formed in every pixel.

Figure 24:
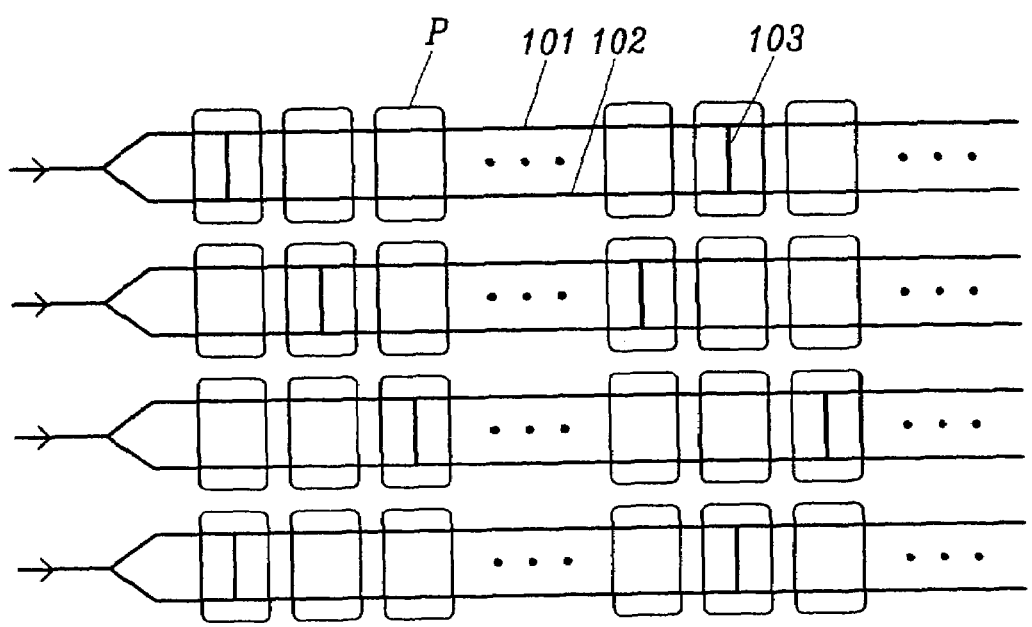
FIG. 24 is a layout view of the thin film transistor substrate according to the tenth embodiment of the present invention.

FIG. 24 is a layout view of the tenth embodiment of the present invention. In FIG. 24, thin film transistors and any other wires, etc. are not shown, just a plurality of doubled-gate lines, connecting lines and pixel regions are shown.

As FIG. 24 illustrates, a plurality of pixels P are formed on a substrate with a matrix manner, and a couple of gate lines 101 and 102 are formed in each pixel row. Since the couple of the gate lines 101 and 102 are connected to each other at the edge of the substrate, the same scan signal is transmitted to the gate lines 101 and 102. In some of the pixels P, a connecting line 103 for connecting two gate lines 101 and 102 is formed inside each pixel. The connecting lines 103 is formed in any selected pixels of all the pixels, the number of the pixels having the connecting line 103 is smaller than the number of the pixels having no connecting line. The ratio of the former to the latter is required to be 1:3.

In this LCD according to the tenth embodiment of the present invention, an aperture in the pixels with a connecting line 103 decreases, when compared to the aperture in the pixels without a connecting line, since the connecting line 103 made of an opaque metal blocks a certain amount of light. In addition, since the connecting line 103 overlaps a pixel electrode (not shown) to create storage capacitance, the pixels having the connecting line 103 obtain bigger storage capacitance than the pixels having no connecting line. As a result, there is a problem that display characteristics of each pixel vary.

To solve these problems, in the eleventh embodiment of the present invention, the connecting lines are formed in some of the pixels, as those in the tenth embodiment, and a projection extending from one of the gate lines is formed in the pixels where the connecting line is not formed.

Figure 25:
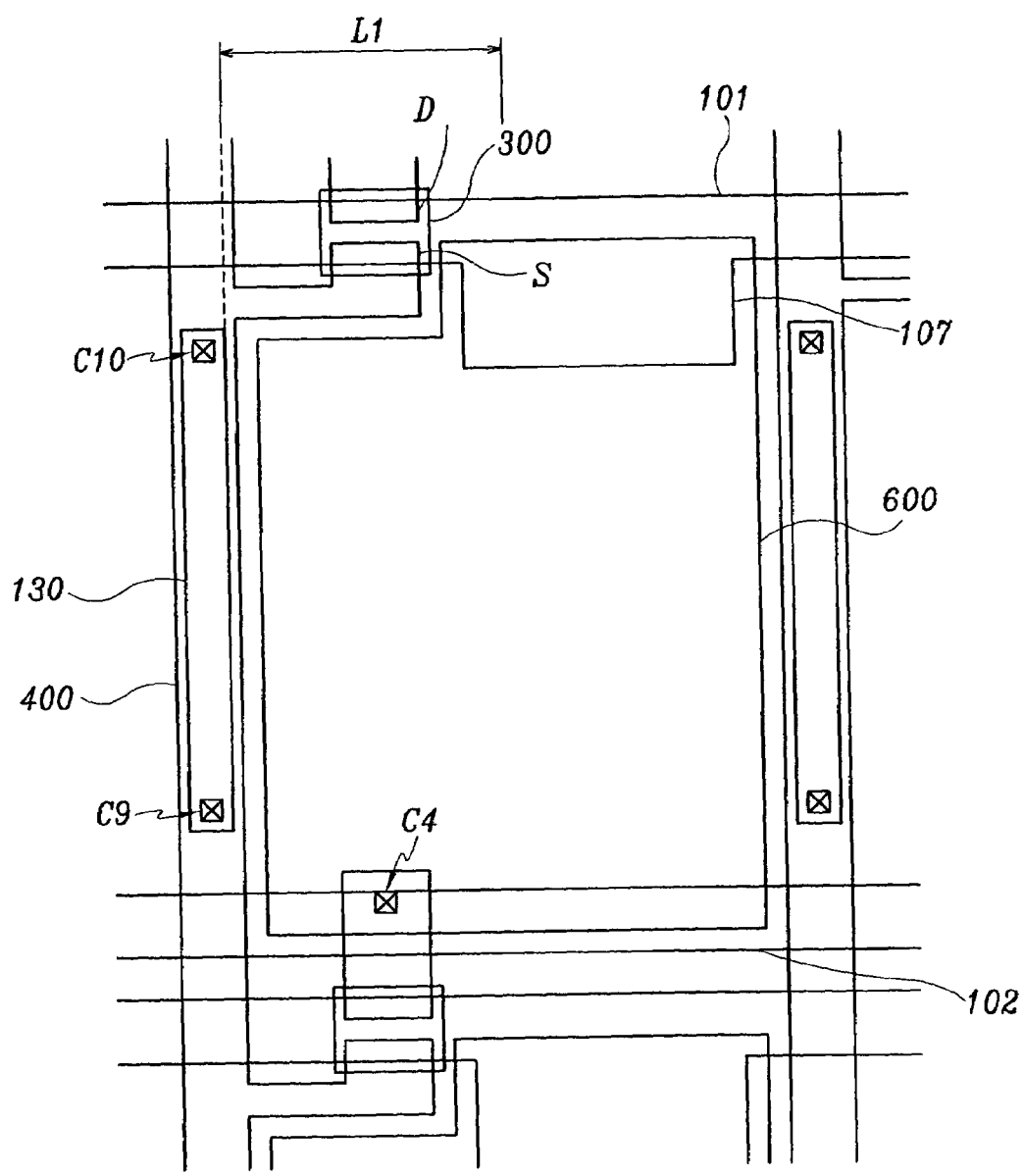
FIG. 25 is a layout view of the thin film transistor substrate according to the eleventh embodiment of the present invention.

FIG. 25 shows a layout view of one pixel where the connecting line is not formed, according to the eleventh embodiment of the present invention. In the eleventh embodiment, the arrangement of the pixels where the connecting line is formed and the pixels where the connecting line is not formed is similar to the arrangement in the tenth embodiment of the present invention, and the structure of the pixel having the connecting line is similar to the structure of the ninth embodiment.

As shown in FIG. 25, the first gate line 101 and the second gate line 102 parallel to each other are formed in a horizontal direction, the first gate line 101 has a projection portion 107 extended toward a pixel region, and the projection portion 107 of the first gate line 101 overlaps a pixel electrode 600. The rest part of the structure is similar to the ninth embodiment of the present invention shown in FIGS. 21 to 23. The area of the projection portion 107 overlapping the pixel electrode 600 can be determined in consideration of the area that the connecting line overlaps the pixel electrode in the pixels where the connecting line is formed, and preferably the area of the latter is the same as the area of the former.

If the projection portion is formed, the storage capacitance in the pixel having no connecting line is increased and the aperture ratio is a little decreased so that the pixel has the same aperture ratio and storage capacitance as in the pixel having the connecting line. This embodiment can not solve the problem of decrease of the aperture ratio.

The twelfth embodiment for solving this problem is shown in FIGS. 26 to 29.

Figure 26:
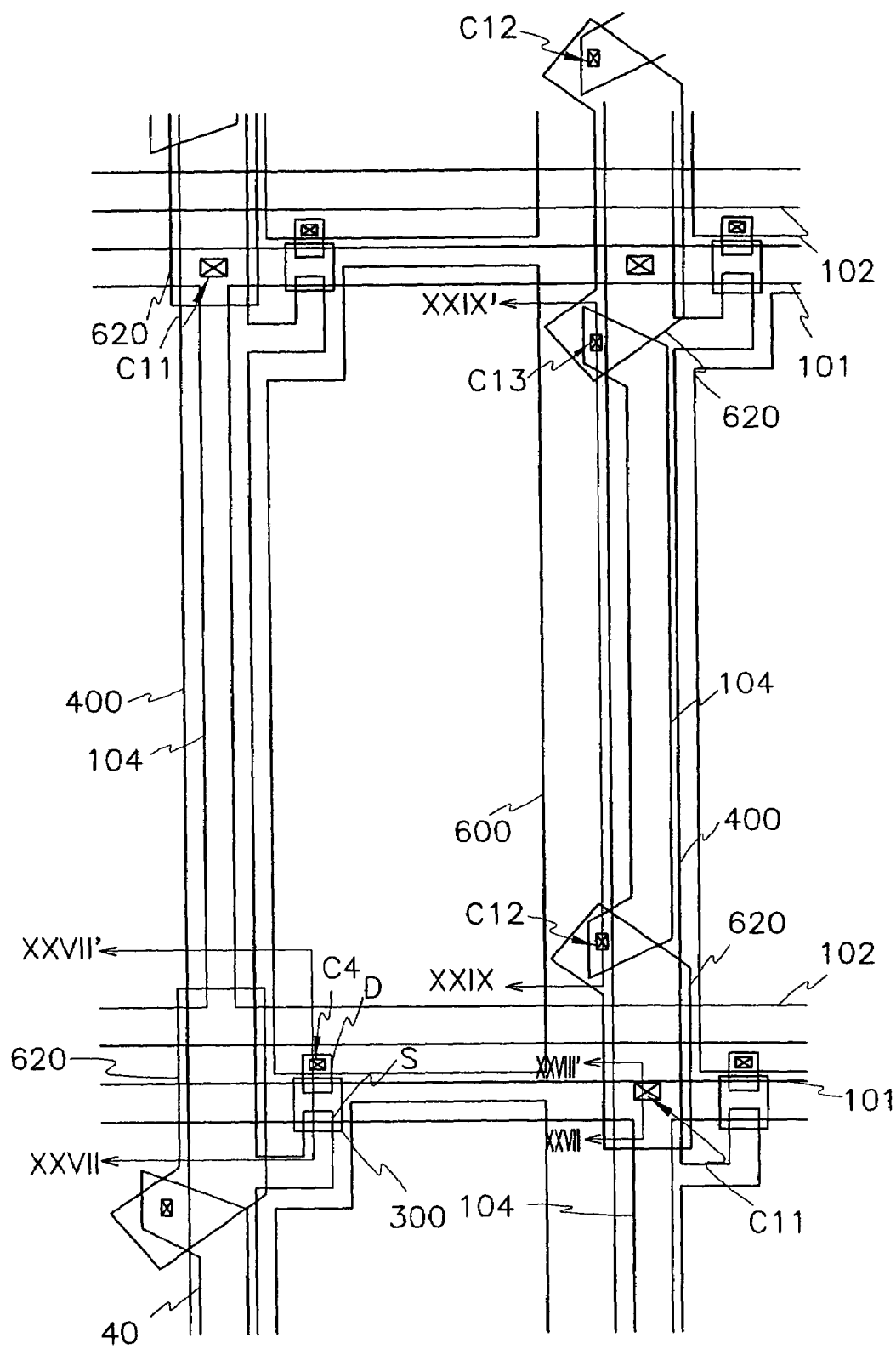
FIG. 26 is a layout view of the thin film transistor substrate according to the twelfth embodiment of the present invention.
Figure 27:
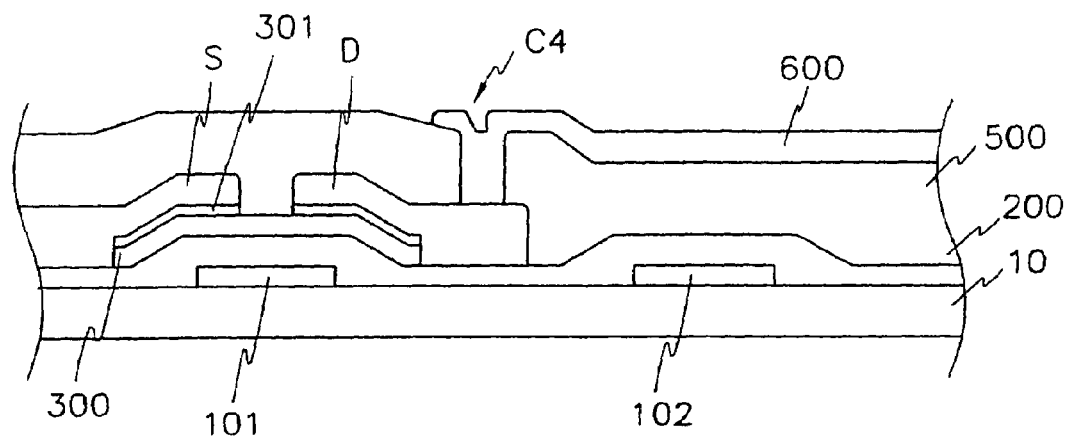
FIG. 27 is a cross sectional view taken along line XXVII-XXVII' in FIG. 26.
Figure 28:
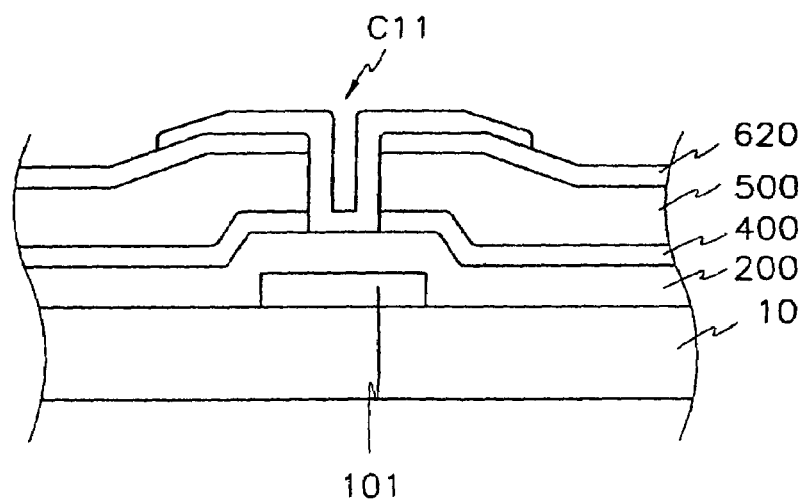
FIG. 28 is a cross sectional view taken along line XXVIII-XXVIII' in FIG. 26.
Figure 29:
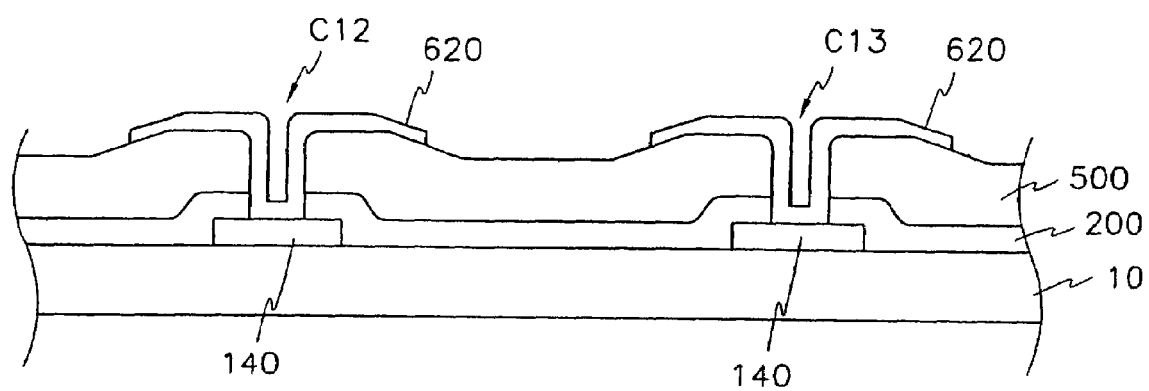
FIG. 29 is a cross sectional view taken along line XXIX-XXIX' in FIG. 26.

FIG. 26 is a layout view of the thin film transistor substrate according to the twelfth embodiment of the present embodiment, FIG. 27 is a cross sectional view taken along line XXVII-XXVII' in FIG. 26, FIG. 28 is a cross sectional view taken along line XXVIII-XXVIII' in FIG. 26, and FIG. 29 is a cross sectional view taken along line XXIX-XXIX' in FIG. 26.

In the twelfth embodiment, the first and the second gate lines 101 and 102, a gate insulating film 200, a semiconductor layer 300, an Ohmic contact layer 301, a data line 400, a source and a drain electrodes S and D, a passivation film 500 and a pixel electrode 600 are similar to those in the ninth embodiment.

As shown in FIGS. 26 to 29, a connecting line 104 which links the first gate line 101 and the second gate line 102 is formed under the data line 400 covered by the data line 400, and a secondary line 140 is formed under the data line where the connecting line is not formed. The secondary line 140 is separated by the first gate line 101 and the second gate line 102. Both ends of the secondary line 140 bent toward the pixel area with a certain angle.

On the passivation film over the intersection of the gate wire such as the first gate line 101 and the second gate line 102 of the previous pixel and the data line 400, a transparent connecting pattern 620 crossing the first gate line 101 and the second gate line 102 overlap the ends of the secondary line 140.

A contact hole C11, through which the data line 400 is exposed at the intersects of the data line 400 and the first gate line 101, is made in the passivation film 500, and contact holes C12 and C13, through which the ends of the secondary line 140 are exposed, are made through the passivation film 500 and the gate insulating film 200. The secondary line 140 is connected to the data line 400 through these holes by the transparent connecting pattern 620.

In the twelfth embodiment of the present invention, the connecting line 104 hidden under the data line 400 does not decrease the aperture ratio. Moreover, since the connecting line 104 and the secondary line 140 are not close to each other, short-circuited defects do not occur.

Next, a structure of a uniform load capacity in the whole area of a substrate is illustrated in the following, in which the ratio of the connecting line to the secondary line is specified.

Figure 30:
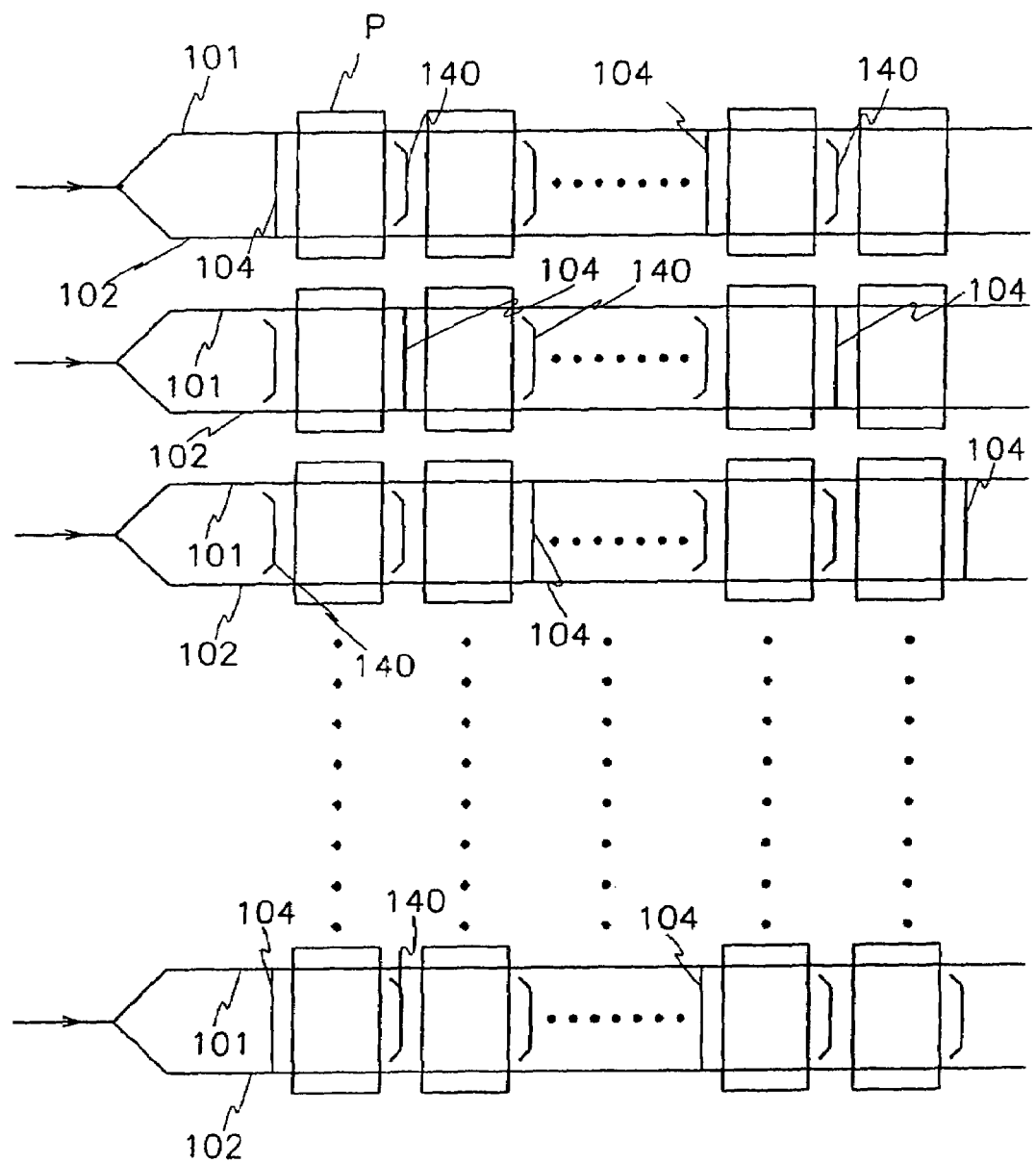
FIG. 30 is a layout view of the gate lines and the pixel regions of the thin film transistor substrate according to the thirteenth embodiment.

FIG. 30 is a layout view of the gate wire and the pixel region of the thin film transistor substrate according to the thirteenth embodiment. In FIG. 30, double gate lines, a connecting line and a pixel region are just illustrated, not a thin film transistor, a substrate or a data wire, etc.

As shown in FIG. 30, a plurality of pixels (P) are arranged in a matrix manner, and connecting lines 104 are formed outside some of the pixels in a vertical direction. Since the locations of the connecting lines 104 are arranged in a manner to change gradually in the pixel matrix, a load capacity applied to the data lines of the whole substrate is uniformly maintained.

For example, if the connecting line 104 is connected to the first row pixel of a plurality of pixels which are connected to one data line (not shown), the connecting lines are not connected to another nine sequent pixels.

The number of the pixels corresponding to the connecting line 104 is smaller than the number of the pixels not corresponding to the connecting line. The ratio of the former to the latter is preferably 1:10 since the possibility of disconnection of the gate lines or the data lines is less than 10%.

Meanwhile, secondary lines 140 for preventing the data line disconnection, which are formed between the gate lines 101 and 102, are corresponding to the pixels P where the connecting line is not corresponding.

As said above, the load capacitance of the wire in the substrate is uniform because the connecting line locations are changing gradually.

In the drawings and specification, typical preferred embodiments of the invention have been disclosed. Although specific terms are employed, they are used in a generic and descriptive sense only and not for purpose of limitation, the scope of the invention being set forth in the following claims.

What is claimed is:

1. A liquid crystal display (LCD), comprising:
   an insulating substrate;
   a plurality of first gate lines formed on the substrate;
   a plurality of second gate lines formed in parallel with the first gate lines;
   a plurality of connecting lines connecting the first gate lines to the second gate lines;
   a plurality of data lines insulated from and crossing the first gate lines and the second gate lines; and
   a plurality of pixel regions defined by the crossings of the first gate lines and the data lines and comprising first pixel regions provided with the connecting lines and second pixel regions not provided with the connecting lines,
   wherein the connecting lines are formed in parallel with the data lines and extended across the center of the first pixel regions.

2. The LCD of claim 1, further comprising a plurality of secondary lines formed on the substrate in parallel with the data lines and electrically connected to the data lines.

3. The LCD of claim 2, wherein the second pixel regions outnumbers the first pixel regions.

4. The LCD of claim 3, wherein a ratio between the first pixel regions and the second pixel regions is higher than 1:3.

5. The LCD of claim 1, further comprising a plurality of transparent pixel electrodes, each overlapping the first gate line and the second gate line.

6. The LCD of claim 5, wherein the pixel electrode overlaps the connecting line of the first pixel region.

7. The LCD of claim 6, wherein the first gate lines comprise a projection portion extending toward the pixel electrode of the second pixel region.

8. The LCD of claim 7, wherein the projection portion overlaps the pixel electrode.

9. The LCD of claim 8, wherein an area of the projection portion overlapping the pixel electrode of the second pixel region has the same size as an area of the connecting line overlapping the pixel electrode of the first pixel region.

10. A liquid crystal display (LCD), comprising:
    a substrate;
    a plurality of first gate lines formed on the substrate;
    a plurality of second gate lines formed in parallel with the first gate lines;
    a plurality of connecting lines connecting the first gate lines to the second gate lines;
    a plurality of secondary lines formed between and electrically disconnected from the first gate lines and the second gate lines and laterally spaced apart from the connecting lines;
    a plurality of data lines crossing the first gate lines and the second gate lines and overlapping the secondary lines;
    a plurality of pixel electrodes overlapping the first and second gate lines.

11. The LCD of claim 10,
    a first insulating layer formed on the first pate lines, the second pate lines and the connecting lines; and
    a second insulating layer formed on the data lines,
    wherein each secondary line is electrically connected to the data line and the pixel electrodes are laterally spaced apart from the date lines.

12. The LCD of claim 10, further comprising a connecting pattern spaced apart from the connecting lines and electrically connecting the secondary line to the data line.

13. The LCD of claim 12, wherein the connecting pattern is made of a transparent conductive material.

14. The LCD of claim 10, further comprising a connecting pattern overlapping the connecting line and electrically connecting the secondary line to the data line.

15. The LCD of claim 10, wherein a number of the connecting lines is less than that of the secondary lines.

16. The LCD of claim 10, wherein the data lines comprising:
    a plurality of first data lines laterally spaced apart from the secondary lines; and
    a plurality of second data lines overlapping the secondary lines,
    wherein a ratio between the first data lines and the second data lines is about 1:10.

17. The LCD of claim 10, wherein locations of the connecting lines are varied.

* * * * *